(12) United States Patent
Sa

(10) Patent No.: US 10,313,859 B2
(45) Date of Patent: Jun. 4, 2019

(54) PERSONAL WORKING SYSTEM CAPABLE OF BEING DYNAMICALLY COMBINED AND ADJUSTED

(71) Applicants: Zhenhua Li, Changning District (CN); Shuang Sa, Richmond (CA)

(72) Inventor: Shuang Sa, Richmond (CA)

(73) Assignee: Zhenhua LI, Changning District (CN)

( * ) Notice: Subject to any disclaimer, the term of this patent is extended or adjusted under 35 U.S.C. 154(b) by 0 days.

(21) Appl. No.: 15/545,415

(22) PCT Filed: Jul. 22, 2015

(86) PCT No.: PCT/CN2015/084858
§ 371 (c)(1),
(2) Date: Nov. 20, 2017

(87) PCT Pub. No.: WO2016/115856
PCT Pub. Date: Jul. 28, 2016

(65) Prior Publication Data
US 2018/0152821 A1 May 31, 2018

(30) Foreign Application Priority Data
Jan. 21, 2015 (CN) .......................... 2015 1 0031290

(51) Int. Cl.
*H04B 5/00* (2006.01)
*H04W 4/80* (2018.01)
(Continued)

(52) U.S. Cl.
CPC .............. *H04W 4/70* (2018.02); *G06F 21/84* (2013.01); *H04L 41/0806* (2013.01);
(Continued)

(58) Field of Classification Search
CPC ........ H04W 4/70; H04W 4/80; H04B 5/0056; H04B 5/0062; H04B 7/0834; H04B 17/27;
(Continued)

(56) References Cited

U.S. PATENT DOCUMENTS 5,345,564 A * 9/1994 Jensen .................. G06F 1/3203
713/600
6,031,634 A * 2/2000 Shimada ............ H04N 1/32128
358/426.05
(Continued)

FOREIGN PATENT DOCUMENTS

CN 1367984 A 9/2002
CN 102707797 A 10/2012
(Continued)

OTHER PUBLICATIONS

International Search Report dated Nov. 12, 2015 of corresponding International application No. PCT/CN2015/084858; 6 pgs.
Extended Search Report dated Aug. 24, 2018 in corresponding European Application No. 15878527.9; 9 pages.

*Primary Examiner* — Andrew Wendell
(74) *Attorney, Agent, or Firm* — Maier & Maier, PLLC

(57) ABSTRACT

The present disclosure provides a personal working system with a dynamic structure, including a central control unit, wherein the central control unit includes a peripheral identifying component for identifying a plurality of peripherals and connecting the plurality of identified peripherals to constitute a working system; a weak (or short-range) communication interface for communication between the central control unit and the peripherals; a strong (or medium-, or long-range) communication interface for communication between the central control unit and an external node; wherein the weak communication interface includes Bluetooth; and the strong communication interface includes a WiFi connection, an Internet connection, a Local Area Network connection, and a wireless telephone connection. An advantage of the present disclosure is that the peripherals will not be outdated and are universal outside of the system.

14 Claims, 22 Drawing Sheets

(51) Int. Cl.
*H04W 4/70* (2018.01)
*H04L 12/24* (2006.01)
*G06F 21/84* (2013.01)
*H04W 84/18* (2009.01)
*G06F 21/32* (2013.01)
*G06F 21/44* (2013.01)
*G06F 21/83* (2013.01)

(52) U.S. Cl.
CPC ........... *H04L 41/0883* (2013.01); *H04W 4/80* (2018.02); *G06F 21/32* (2013.01); *G06F 21/44* (2013.01); *G06F 21/83* (2013.01); *G09G 2370/16* (2013.01); *G09G 2370/22* (2013.01); *H04W 84/18* (2013.01)

(58) Field of Classification Search
CPC .. H04L 41/0883; H04L 41/0806; G06F 21/64
See application file for complete search history.

(56) References Cited

U.S. PATENT DOCUMENTS

| | | | | |
|---|---|---|---|---|
| 6,154,793 | A * | 11/2000 | MacKenna | G06F 13/28 710/10 |
| 2004/0091113 | A1 * | 5/2004 | Sanai | H04L 63/0428 380/255 |
| 2004/0148499 | A1 * | 7/2004 | Broyles, III | G06F 9/4401 713/2 |
| 2004/0209605 | A1 * | 10/2004 | Urban | H04W 4/20 455/415 |
| 2006/0170588 | A1 * | 8/2006 | Chang | G01S 19/17 342/357.55 |
| 2007/0002886 | A1 * | 1/2007 | Lanigan | H04L 12/2805 370/432 |
| 2015/0006624 | A1 * | 1/2015 | Yamada | H04L 67/1036 709/203 |
| 2015/0121506 | A1 * | 4/2015 | Cavanaugh | G06F 21/62 726/16 |
| 2017/0012821 | A1 * | 1/2017 | Sa | G06F 1/1632 |

FOREIGN PATENT DOCUMENTS

| | | |
|---|---|---|
| CN | 103597691 A | 2/2014 |
| CN | 104794097 A | 7/2015 |
| EP | 2 784 686 A1 | 10/2014 |
| WO | 2013/045467 A1 | 4/2013 |

* cited by examiner

| Central processor ID | Peripheral Group ID | Peripheral ID | Usage status |
|---|---|---|---|
| Center ID1 | Peripheral Group ID1 | Peripheral ID11 | Idle/working/locked |
| | | Peripheral ID12 | |
| | | Peripheral ID13 | |
| | | ...... | |
| | | Peripheral ID1k | |
| Center ID2 | Peripheral Group ID2 | Peripheral ID21 | Idle/working/locked |
| | | Peripheral ID22 | |
| | | Peripheral ID23 | |
| | | ...... | |
| | | Peripheral ID2m | |
| ...... | ...... | ...... | Idle/working/locked |
| Center IDn | Peripheral Group IDN | Peripheral IDNn | Idle/working/locked |

Fig. 2C

| Peripheral processing unit ID | PeripheralID/ Peripheral Group ID | Request content | Operation state |
|---|---|---|---|
| Peripheral processing unit ID1 | PeripheralID1/ Peripheral Group ID1 | | Reject/wait/ complete |
| Peripheral processing unit ID2 | PeripheralID2/ Peripheral Group ID2 | | Reject/wait/ complete |
| Peripheral processing unit ID3 | PeripheralID3/ Peripheral Group ID3 | | Reject/wait/ complete |
| ...... | ...... | | Reject/wait/ complete |
| Peripheral processing unit IDn | PeripheralIDn/ Peripheral Group IDn | | Reject/wait/ complete |

Fig. 2D

PERSONAL WORKING SYSTEM CAPABLE OF BEING DYNAMICALLY COMBINED AND ADJUSTED

BACKGROUND OF THE INVENTION

With the increasing development of electronic technologies and communication technologies, personal audio-visual and personal communication devices become more and more prevalent. To meet the requirements of consumers on different functions, screen sizes, portability degrees, input manners, battery durations and the like, a variety of electronic communication and working devices have emerged one after another on the market, such as smart phones, portable audio-visual devices, tablet computers, readers, navigators, smart watches, intelligent body builders, personal healthcare detection devices, etc.

In order to meet the requirements of consumers on different specific functions, screen sizes, portability degrees, input manners, battery durations and the like, manufacturers have to launch electronic devices having varieties of matches and combinations of software and hardware of substantially the same core structure based on the technical level at that time, for example, different sizes and models of tablet phones with only varying screen sizes but substantially the same mainboards and other configurations.

Consumers are forced to make more choices for various usage demands (for example, query and communication when taking a vehicle, watching movies, word processing, drawing, portability, surfing the internet, and route navigation) and even merely periodic (or temporary) demands. What underlie the numerous choices are actually similar circuits and operating architecture. For example, after dissecting some devices on the market (including smart phones, portable audio-visual players, tablet computers, readers, navigators, smart watches, intelligent body builders and personal healthcare detection devices), the Inventor found that most structures are similar.

In existing electronic communication devices, multiple functions are typically integrated within a space as small as possible, thereby bearing high manufacturing costs incurred by the integration, and also bringing such problems to the products as difficulty in heat dissipation, high update and upgrade costs and the like; even some important functions and features have to be sacrificed and abandoned to satisfy the lightweight requirements of the products. Due to different demands, consumers have to repeatedly buy identical products, are bothered to import and export data and contact lists and repeatedly synchronize, and even have to buy an entire device at a high price only for the demand for a certain performance.

The existing devices have the following structural defects:

1. waste in repeated structures and difficulty to upgrade:

Taking a mobile electronic information processing device as an example, each mobile electronic information processing device on the current market basically has some identical device configurations (such as CPU+GPU+ROM+RAM+ microphone+receiver+camera+gravity sensor+Bluetooth+ wireless connection (WiFi)+screen+touch screen and other components). That is to say, you spend more than half of the money on redundant components when you own your second mobile electronic device; moreover, every time your demand on a certain function changes, even only a very simple part thereof, you may have to completely replace the entire device. When a new peripheral emerges, it will be impossible to upgrade and update the peripheral devices.

2. Poor adaptability of a fixed structure:

A fixed structure in the existing personal working systems has a poor adaptability. Taking a PAD processing device as an example, in a currently popular iPad tablet computer of Apple Inc., the CPU+GPU+ROM+RAM+microphone+receiver+camera+gravity sensor+Bluetooth+wireless connection (WiFi)+screen+touch screen are integrated together, such that regardless in a quiet office, on a crowded bus, or in a spacious living room, a user has no choice but to look at the screen of the same size and listens to the sound with the same effect. Such portable smart devices has the same size, but cannot be randomly combined to use a screen of a varying size in different occasions, for example.

3. The structure of existing display devices cannot effectively display information.

SUMMARY OF THE INVENTION

The present disclosure relates to a novel working system, and particularly to a dynamic structure and method for forming a personal working system.

The principle is to functionally split an existing device having a fixed structure to construct an information collecting and processing system and a communication exchanging system that are dynamically connected to control a central body and a plurality of functional units.

The communication information working system provided by the present disclosure is a dynamic communication working system comprising one or more central processing units and one or more peripherals (or peripheral units) and capable of implementing a series of functions and completing a series of tasks, wherein the central processing unit has a centralized data processing function, the peripheral (or the peripheral unit) executes a specific function. The one or more peripherals (or peripheral units) and the central processing unit may be mutually identified to establish a link to exchange data, may receive various data (or various processed data), instructions or commands from the central processing unit and execute or process the various data (or various processed data), instructions or commands transmitted thereto by the central processing unit.

The link established for the mutual identification between the one or more peripherals and the central processing unit may be a range-restricted or even an exclusive link; some proprietary or confidential peripherals should also have function requirements of exclusiveness and compulsorily disconnecting and removing previous link information. Before the communication working system is formed, the central processing unit and the peripherals cannot individually complete a certain series of tasks; instead, the central processing unit must be paired with one or more peripherals to form the working system so as to complete the series of tasks together.

The personal working system provided by the present disclosure may enable background functional parts of the existing electronic device to be integrated and centralized in a "central processing unit," or the background functions to be selectively integrated and centralized in a "peripheral processing unit," so as to be dynamically shared by a plurality of peripherals; meanwhile, personalization directed to different device users (consumers)' personal demands enables the plurality of peripherals of the personal working system to be more specialized and simplified. The "central processing unit" and the "peripherals" form a set of portable, dynamically combinable, and adjustable personal communication information processing system. The peripherals may be randomly and freely matched, such that they will not be out of date and are universal throughout the world. With the personal "central processing unit," the user may use any external application device in any scenario around the world.

According to the present disclosure, the user invests once to buy a "central processing unit" and randomly matches a "peripheral" according to any change of his/her personal preference. The user may randomly combine and use the "peripherals," as long as he/she can obtain or access the "peripherals" or access the peripheral processing unit (or peripheral processing service center) that manages the "peripherals." For example, the user may have a variety of peripherals, such as "a watch peripheral," "a spectacle frame peripheral," "a mobile phone peripheral," "a desktop peripheral," "a vehicle-mounted peripheral," "a living room TV," "a bedroom projector," etc. Each peripheral abandons the complicated and expensive internal structure and becomes the simplest and the most simplified device; they share the same "central processing unit" provided with an integrated computing center or are shared by different "central processing units." The user may save a considerable portion of the current manufacturing cost of each mobile device. The "central processing unit" and the "peripherals" can be updated and upgraded more conveniently with fewer costs. That is to say, after the computing centers are centralized and integrated, the user may obtain a "central processing unit" with a double speed and a double internal memory with the same cost. The same type of peripherals may also be configured according to different conditions. For example, a "peripheral" with a larger screen is configured at home while a "peripheral" with a smaller screen is configured during travel.

Compared with a traditional portable tablet computer, the functional components, such as a screen, a touch screen, a keyboard, a mouse, a microphone, a receiver, a loudspeaker, a camera, a gravity sensing device and the like, are eliminated from the "central processing unit" in the present disclosure, so that the volume of a host is greatly reduced. The eliminated functional components become separate and individual parts or a combination of multiple functional components form the "peripherals," wherein only a processor, a ROM, a RAM, a wired/wireless connection, a battery or power supply that are essential for functioning are reserved, such that the present central processing unit is especially simplified. The "peripherals" with corresponding functions can be developed to the extremity without being limited by other components. For example, a peripheral screen can be very large or very small depending on user demands. Compared with the traditional portable tablet computers, the dynamically combinable and adjustable personal working system according to the present disclosure is more cheap, more convenient and more user-friendly.

The present disclosure provides a dynamically combinable and adjustable portable personal communication information working system, including a central control unit and a peripheral processing unit that manages one or more peripherals. According to the present disclosure, the central control unit includes a peripheral identifying component and an operating system, for identifying a plurality of peripherals and connecting the plurality of identified peripherals into a working system. The communication working system provided by the present disclosure further includes a communication interface for communication between the central control unit and components of the peripherals (or other peripherals). For example, a weak (or short-range) communication interface for communication between the central control unit and the components of the peripherals; a strong (or medium-range and long-range) communication interface for communication between the central control unit and an external node; the weak communication interface includes Bluetooth; the strong communication interface includes Wi-Fi connection, Internet connection, local area network connection and radio telephone connection.

The present disclosure provides a novel technical methodology, which is full-range, omnibearing, and integrated at the highest level, specialized and universal for manufacturers and consumers, bringing new revolutionary simplicity and economization for the whole field.

To fulfill the above-mentioned purpose, the present disclosure provides a working system, including:

a central control unit, wherein the central control unit comprises a peripheral identifying component for identifying a plurality of peripherals and connecting the identified plurality of peripherals to constitute a working system.

BRIEF DESCRIPTION OF THE DRAWINGS

FIG. 2C shows a usage status table (or a status tracking table) 203 of a peripheral group (peripheral group 1, peripheral group 2, . . . , peripheral group n) used by one or more central processing units 120 at a peripheral processing unit 110 (or a peripheral processing service center 110') end;

FIG. 2D shows a usage status table (or a status tracking table) 204 of a peripheral 131 (131.1, 131.2, . . . 131.$n$) or a peripheral group (peripheral group 1, peripheral group 2, . . . , peripheral group n) in one or more peripheral processing units 110 (or peripheral processing service centers 110') used by a central processing unit 120 at the central processing unit 120 end;

DETAILED DESCRIPTION OF THE EMBODIMENTS

The present disclosure discloses a novel communication working system, and particularly a novel structure of a dynamically combinable information system and a method therefor.

Figure 1:
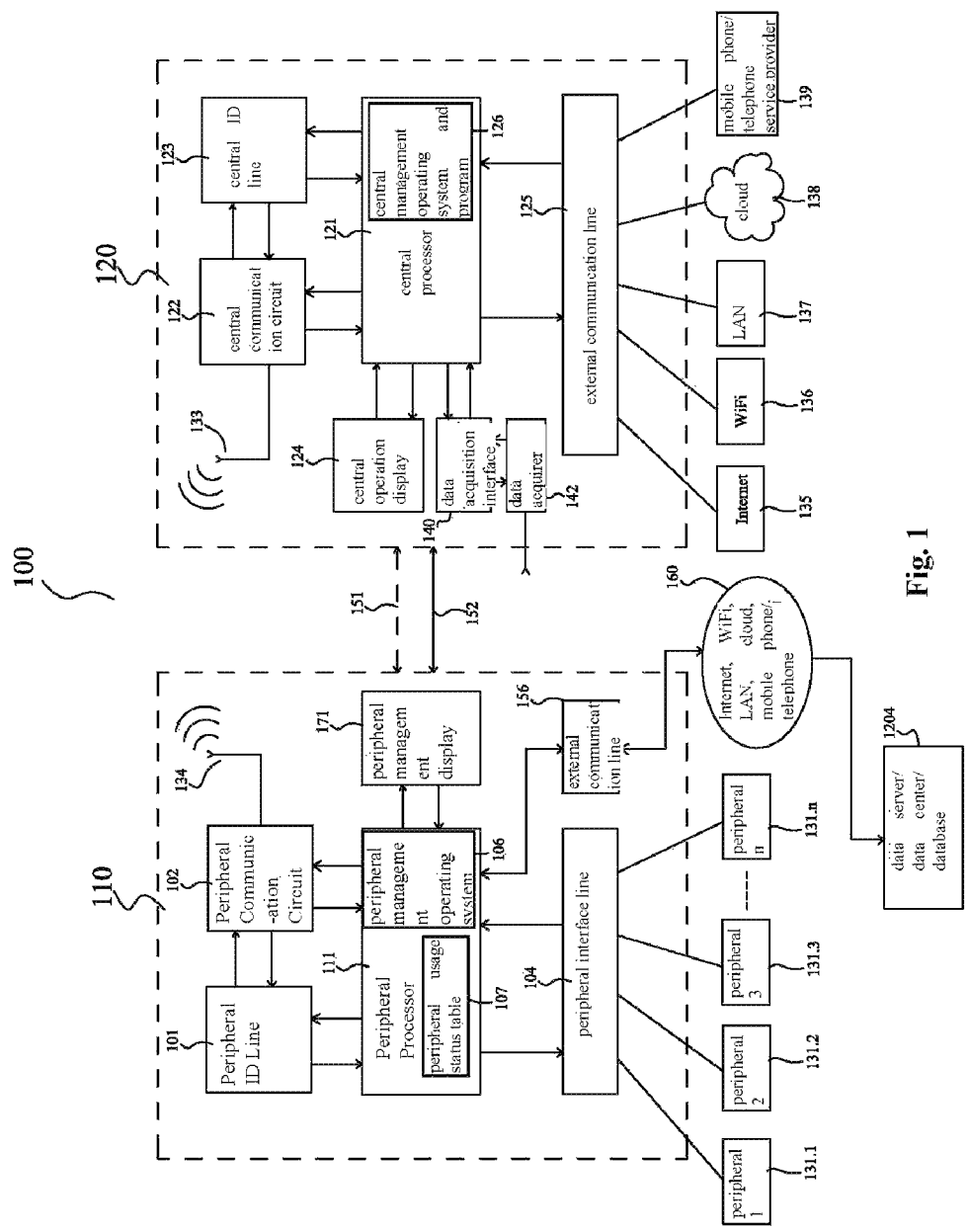
FIG. 1 shows an embodiment 100 of a novel communication working system of the present disclosure.
Figure 10A:
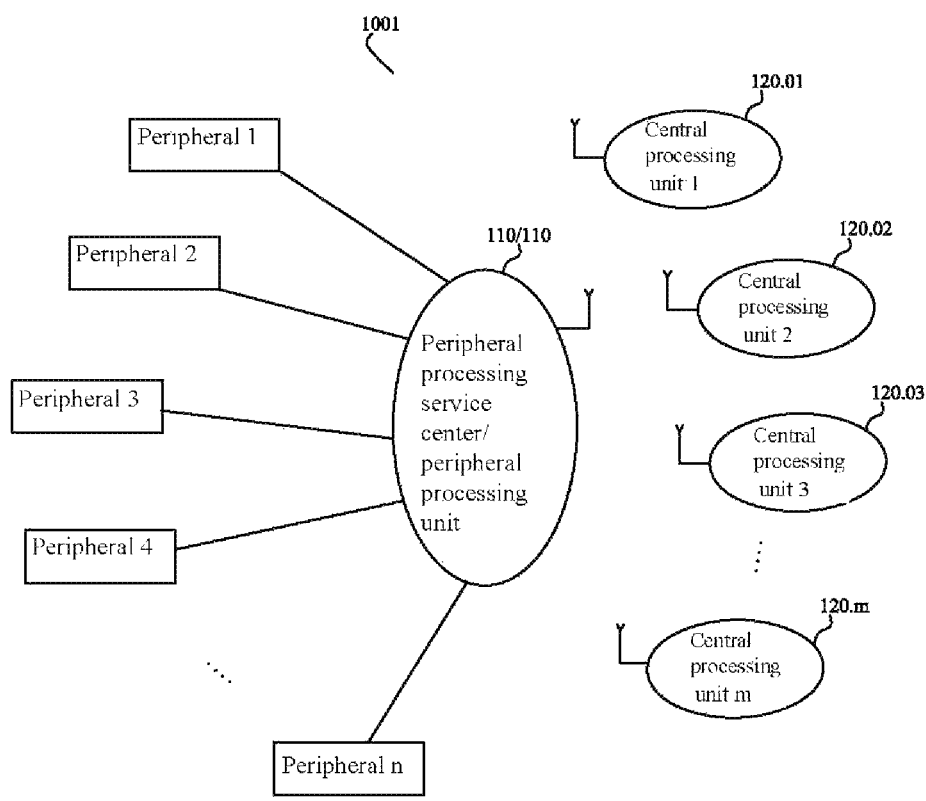
FIG. 10A is a structural schematic diagram showing a working system 1001 comprising a plurality of central processing units 120 and a peripheral processing unit 110.
Figure 10B:
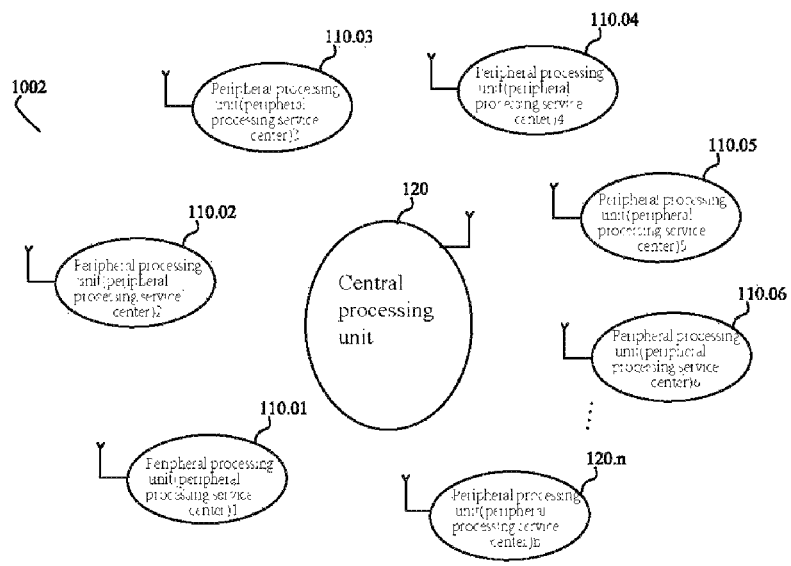
FIG. 10B is a structural schematic diagram showing a working system 1002 comprising a central processing unit 120 and a plurality of peripheral processing units.

FIG. 1 shows an embodiment 100 of a novel communication working system of the present disclosure. As shown in FIG. 1, a novel communication working system 100 of the present disclosure comprises a central processing unit 120 and a peripheral processing unit 110 (or a peripheral processing service center 110'), wherein the central processing unit 120 and the peripheral processing unit 110 (or the peripheral processing service center 110') may communicate with each other in a wireless or wired mode. As shown in FIG. 10A, in a system open to multiple users and/or equipped with a plurality of peripherals, the peripheral processing unit 110 may be a server or a server system (i.e., the peripheral processing service center 110'), and the peripheral processing unit 110 or peripheral processing service center 110' may provide services to a plurality of central processing units 120 (120.1, 120.2, . . . , 120.m). As shown in FIG. 10B, one central processing unit 120 may communicate with a plurality of peripheral processing units 110 (110.1, 110.2, . . . , 110.n). As shown in FIG. 10B, one central processing unit 120 may be served by a plurality of peripheral processing units 110 (or peripheral processing service center 110').

The central processing unit 120 comprises a central processor 121, a central communication circuit 122 (which may be wireless or wired) connected to the central processor 121, a central ID circuit 123 (for storing a unique ID of the central processing unit 120) connected to the central processor 121, an external communication line 125 connected to the central processor 121, a central operation display device 124 connected to the central processor 121, a data acquisition interface 140 connected to the central processor 121, and a data acquirer 142 connected to the data acquisition interface 140. The data acquisition interface 140 may acquire information about a user, and the data acquisition interface 140 feeds the acquired information about the user to the central processor 121; the central processor 121 may emit password information about the user to the peripheral processing unit 110 (or the peripheral processing service center 110'), and the peripheral processing unit 110 (or the peripheral processing service center 110'), after checking and passing the password information, allows the central processing unit 120 to access its system, thereby enhancing usage security. The external communication line 125 of the central processing unit 120 communicatively connects the central processor 121 (or the central processing unit 120) with an Extranet node. The Extranet node includes Internet 135, WiFi 136, local area network 137, cloud (or cloud server) 138, and a telephone server 139.

To simplify the circuit of the central operation display device 124 to the utmost extent and reduce power consumption as much as possible, the central operation display device 124 may be a simplest black-and-white liquid crystal display screen, as long as it may satisfy the simplest display function. The external communication line 125 is connected to a plurality of external nodes. The external nodes may include the Internet, WiFi, a local area network, a cloud end, a mobile phone, or a telephone. The central processor 121 is provided with a memory 126 in which a central management operating system and programs are stored. After running the central management operating system and the programs, the central processor 121 may manipulate and control other lines in the central processing unit 120.

The peripheral processing unit 110 comprises a peripheral processor 111, a peripheral interface circuit 104 in communicative connection with the peripheral processor 111, a peripheral communication circuit 102 connected (wiredly or wirelessly) to the peripheral processor 111, a peripheral ID storage circuit 101 connected to the peripheral processor 111 (for storing unique IDs of the peripheral processing unit 110 or the peripheral processing center 110'), a peripheral management display device 103 connected to the peripheral processor 111, and an external communication line 156 connected to the peripheral processor 111, wherein the external communication line 156 is connected to the Internet, WiFi, or local area network 160 such that the external processing unit 110 is communicatively connected to a website, a data server, and a data center 1204. The peripheral interface line 104 is connected to a plurality of peripherals 131 (131.1, 131.2, . . . , 131.n); the peripherals may include a keyboard, a mouse, a microphone, a loudspeaker, a display, a screen, and a scanner, etc. The peripheral processor 111 is provided with a memory 106 in which a peripheral management operating system and programs are stored. After running the peripheral management operating system and the programs, the peripheral processor 111 may manipulate and control all other lines in the peripheral processing unit 110. Through the peripheral management display device 103, a system administrator may set the peripheral processing unit 110 as needed, e.g., adding peripherals 131 (131.1, 131.2, . . . , 131.n) or setting parameters for the interface circuit of the peripherals 131 (131.1, 131.2, . . . , 131.n).

In the present disclosure, the ID of the central processing unit 120 and the ID of the peripheral processing unit 110 (or the peripheral processing service center 110') are arranged for being mutually paired, mutually identified, and mutually authenticated. Like the external communication line 125 of the central processing unit 120, the external communication line 156 of the peripheral processing unit 110 (peripheral processing center 110') communicatively connects the peripheral processor 111 (peripheral processing unit 110) to an Extranet node, which includes the Internet, WiFi, a local area network, a cloud end (or a cloud server), and a telephone server. An external communication line 156 is provided at the peripheral processing unit 110, so that the external communication line 125 in the central processing unit 120 may be omitted, and the central processing unit 120 may communicate with the Extranet node via the peripheral processing unit 110 (peripheral processing center 110'), so as to further miniaturize the central processing unit 120. Moreover, by providing the external communication line 156 at the peripheral processing unit 110 (peripheral processing center 110') and excluding the external communication line 125 from the central processing unit 120, when an additional or newly unveiling communication protocol or technology is needed, it is only required to change the external communication line 156 of the peripheral processing unit 110, without a need to change the central processing unit 120.

The central processing unit 120 and the peripheral processing unit 110 communicate (wiredly or wirelessly) with each other via the central communication circuit 122 and the peripheral communication circuit 102 of the peripheral processing unit 110. No data exchange is done between application peripheral devices 131 (131.1, 131.2, . . . , 131.n), and the application peripheral devices 131 only send data or commands to the central processing unit 120 or receive the data or commands from the central processing unit 120. The central processing unit 120, after processing the data or commands sent by the application peripheral devices 131 (131.1, 131.2, . . . , 131.n), generates results, and then possibly sends the results to one or more application peripheral devices 131 (131., 131.2, . . . , 131.n) to execute. The functions of the application peripheral devices 131 (131.1, 131.2, . . . , 131.n) may be repetitive (e.g., a plurality of screens simultaneously display the information, data and command emitted by the central processing unit 120). A plurality of application peripheral devices 131 (131.1, 131.2, . . . , 131.n) may be combined into a peripheral group (e.g., including a mouse, a keyboard, a display screen, a loudspeaker, a microphone). By combining the matched application peripheral devices 131 (131.1, 131.2, . . . , 131.n), the peripheral group as a whole is paired and communicates with the central processing unit 120. The application peripheral devices 131 (131.1, 131.2, . . . , 131.n) may be paired and used with a plurality of central processing units 120 within different periods of time; however, in the same period of time, the same application peripheral 131 (131.1, 131.2, . . . , 131.n) or the same peripheral group can only be paired and communicate with the same set of central processing unit 120 within the same period of time.

As an alternative embodiment, in the central processing unit 120, the central communication circuit 122, the central ID circuit 123, and the external communication line 125 may be integrated into the central processor 121. Likewise, in the peripheral processing unit 110, the external communication circuit 102, the peripheral request ID circuit 101, and the peripheral external circuit 104 may be integrated into the peripheral processor 111.

In FIG. 1, the wireless communication between the ID of the central processing unit 120 and the peripheral processing unit 110 (or the peripheral processing service center 110') via antennas 133 and 134 is indicated by a bidirectional dotted line 151; and the wired communication is indicated by a bidirectional solid line 152.

Figure 2A:
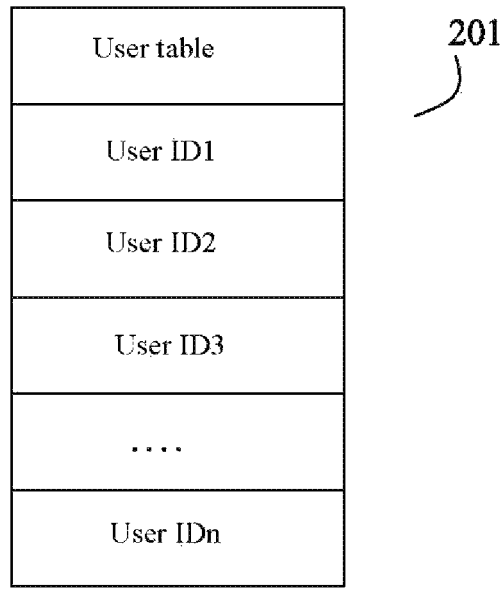
FIG. 2A shows a user table 201.

FIG. 2A shows a user table 201 for storing, in the peripheral processing unit 110 (or peripheral processing service center 110'), the IDs of central processing units 120 that are allowed to use the peripheral processing unit 110.

Figure 2B:
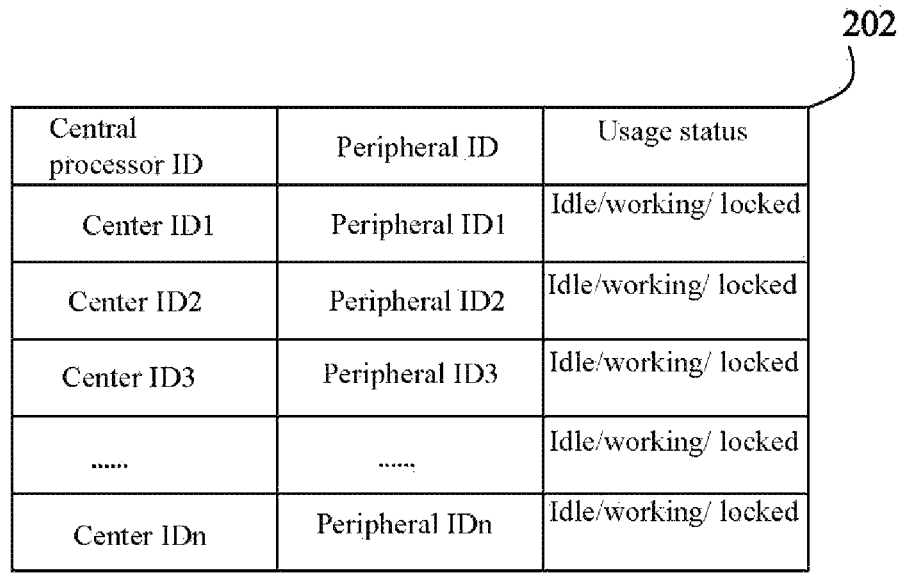
FIG. 2B shows an individual peripheral 131 (131.1, 131.2, . . . 131.$n$) used by one or more central processing units 120.

FIG. 2B shows a usage status table (or status tracking) 202 of individual peripherals 131 (131.1, 131.2, . . . , 131.n) used by one or more central processing units 120 and stored at the peripheral processing unit 110 (or peripheral processing service center 110') end, for indicating the status of the central processing units 120 (120.1, 120.2, . . . , 120.m) entering the system and the status of the peripherals 131 used by the accessed central processing unit 120. Specifically, a first column of the usage status table 202 records the central processing unit ID (which may represent the IDs of users); a second column of the usage status table 203 records the IDs of the peripherals 131 (which may represent the peripherals); and the third column of the usage status table 201 records the status of the peripherals 131, including three states: idle, locked, or working.

FIG. 2C shows a usage status table (or status tracking) 203 of peripheral groups (device group 1, device group 2, . . . , device group n) used by one or more central processing units 120 and stored in the peripheral processing unit 110 (or peripheral processing service center 110') end, for indicating the status of the central processing units 120 (120.1, 120.2, . . . , 120.m) entering the system and the status of the peripheral groups used by the accessed central processing unit 120. Specifically, the first column of the usage status table 203 records a certain central processing unit ID (which may represent the ID of the user); the second column of the usage status table 203 records the peripheral group ID, the third column of the usage status table 203 records the ID of each device in the peripheral group (which may represent the peripheral); and the fourth column of the usage status table 203 records the status of the peripheral group, including three states: idle, locked or working. The peripheral group usage status table 203 enables all devices in the device group to be selected by one request when the central processing unit 120 requests the peripheral processing unit 110 (or the peripheral processing service center 110') for a peripheral. In this way, the peripheral processing unit 110 (or the peripheral processing service center 110') may combine the peripherals in an optimized manner. Without the function of group selection, when a plurality of central processing units 120 (120.1, 120.2, . . . , 120.m) request for a peripheral service from one peripheral processing unit 110 (or peripheral processing service center 110'), it would be hard for a certain central processing unit 120 to select an optimized combination of peripherals.

Before running a peripheral or a peripheral group, the peripheral processing unit 110 (or peripheral processing service center 110') fills the IDs of the central processing units (central ID1, central ID2, central ID3, . . . , central IDn) in the first column of the peripheral usage status table 202 or the peripheral usage status table 203, indicating that all central processing units with the IDs (central ID1, central ID2, central ID3, . . . , central IDn) are using corresponding peripherals or peripheral groups in the peripheral processing unit 110 (or the peripheral processing service center 110'); later during the use process, contents of a corresponding row in the table are updated based on the received IDs of the central processing units. The status table 202 and the status table 203 reflect one or more central processing units 120 that are currently using the peripheral processing unit 110 (or peripheral processing service center 110').

FIG. 2D shows a usage status (or status tracking) table 204 of peripherals 131 (131.1, 131.2, . . . , 131.n) or peripheral groups (device group 1, device group 2, . . . , device group n) in one or more peripheral processing units 110 (or peripheral processing service centers 110') used by a certain central processing unit 120 and stored in the central processing unit 120 end. Specifically, the first column of the usage status table 204 records the ID of the peripheral processing unit (or peripheral processing service center); a second column of the usage status table 204 records IDs of peripherals or peripheral groups (which may represent the peripherals or peripheral groups that are requested or used); the third column of the usage status table 204 records a requested content; the fourth column of the usage status table 204 records operation status, including three states: rejection, waiting for an operation result, and completed. After the central processing unit 120 receives a request grant from one peripheral processing unit 110 (or the peripheral processing service center 110'), the central processing unit 120 fills the ID of the peripheral processing unit 110 (or the peripheral processing service center 110') into the first column of the usage status table 204; later during the use process, content of a corresponding row in the table will be updated based on the ID of the peripheral or peripheral group as received. The status table 204 reflects one or more peripheral processing units 110 (or peripheral processing service centers 110') currently used by the central processing unit 120.

The tables in FIGS. 2A-C are stored in the peripheral processing unit 110 (or peripheral processing service center 110'), such that the peripheral processing unit 110 (or the peripheral processing service center 110') can check and track one or more central processing units 120 about their communication with and use of the peripheral processing unit 110 (or peripheral processing service center 110'); while the table in FIG. 2D is stored in the central processing unit 120, such that in the central processing unit 120, communication and use of one or more peripheral processing units 110 (or peripheral processing service centers 110') can be checked or tracked. Setting of the usage status (or status tracking) of the tables 201-204 enables a certain central processing unit 120 to communicate with a plurality of peripheral processing units 110 (or peripheral processing service center 110') and also enables a certain peripheral processing unit 110 (or peripheral processing service center 110') to communicate with a plurality of central processing units 120.

Figure 3:
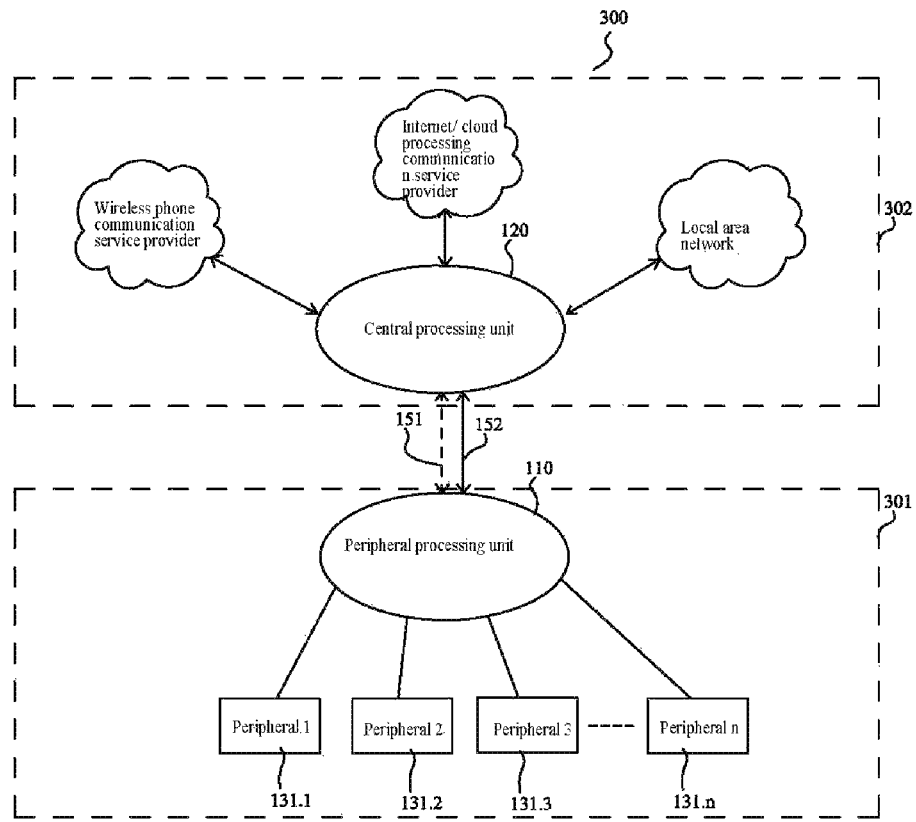
FIG. 3 is a structural schematic diagram showing a communication working system 300 formed according to the present disclosure.
Figure 14:
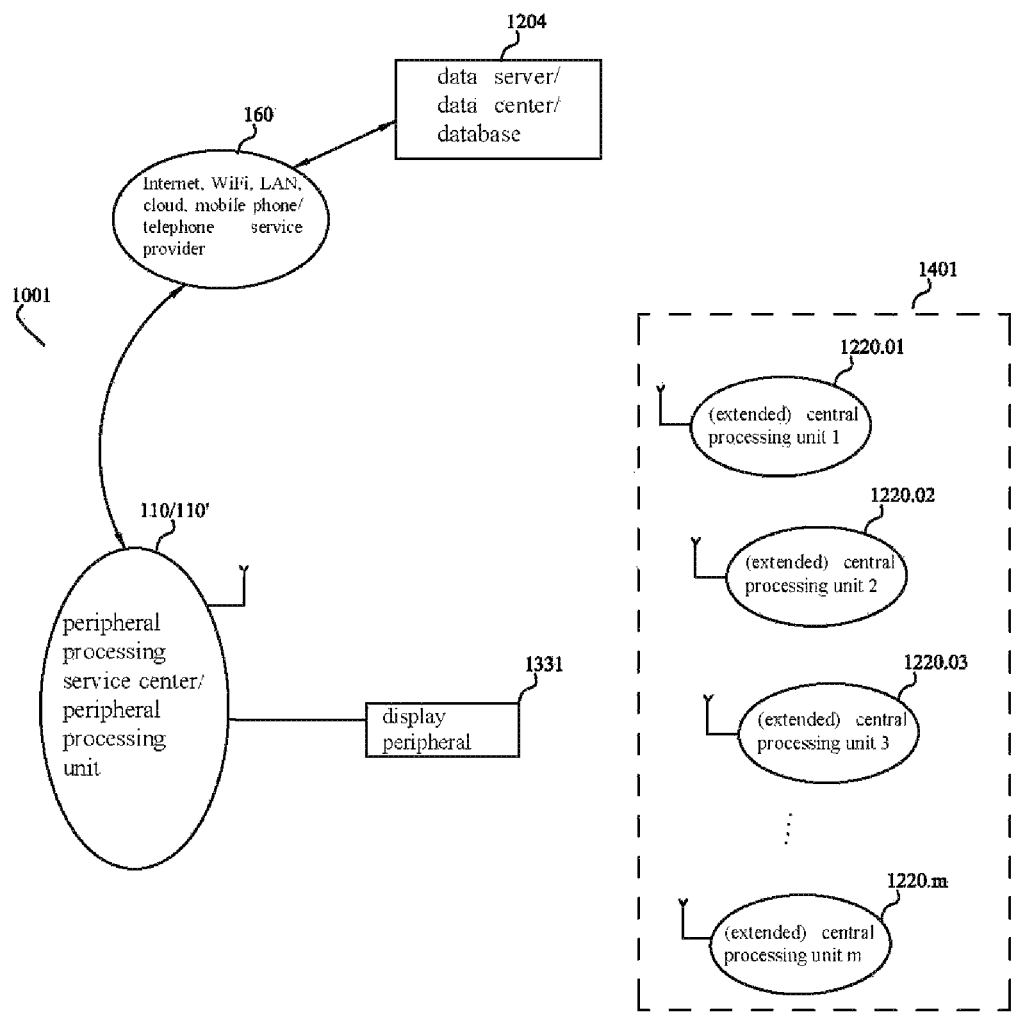
FIG. 14 shows a display system 1400 of the present disclosure.

FIG. 3 shows a communication working system 300 of the present disclosure, comprising a central processing unit 120 and a peripheral processing unit 110. The central processing unit 120 communicates (wiredly or wirelessly) with the peripheral processing unit 110; the central processing unit 120 may communicate with Extranet nodes via its external communication line 125. The Extranet nodes include a wireless telephone communication server 161, an Internet/cloud processing server 162, and a local area network 163. Meanwhile, via its communication circuit 122, the central processing unit 120 communicates with the peripheral processing unit 110 (or peripheral processing service center 110') so as to connect a peripheral 1, a peripheral 2, a peripheral 3, . . . , and a peripheral n. Therefore, in the system of FIG. 3, for the central processing unit 120, the peripheral processing unit 110 (or the peripheral processing service center 110') and the application peripheral devices 131 (131.1, 131.2, . . . , 131.n) form an Intranet 301, while the wireless telephone communication server 161, the Internet/cloud processing server 162 and the local area network 163 are Extranets 302. Via its Intranet 301, the central processing unit 120 may select different peripheral 1, peripheral 2, peripheral 3, . . . , and peripheral n, which may form a working system that can complete one or more tasks; via its Extranet 302, a plurality of central processing units 120 (120.1, 120.2, . . . , 120.m) may be connected and communicate with each other (as shown in FIG. 14). Moreover, the peripheral processing unit 110 per se in the communication working system 300 shown in FIG. 3 may be a portable mobile device specifically for connecting a plurality of portable peripherals, e.g., a keyboard, a mouse, a hard disk and a small screen, convenient for use during travel.

Figure 4:
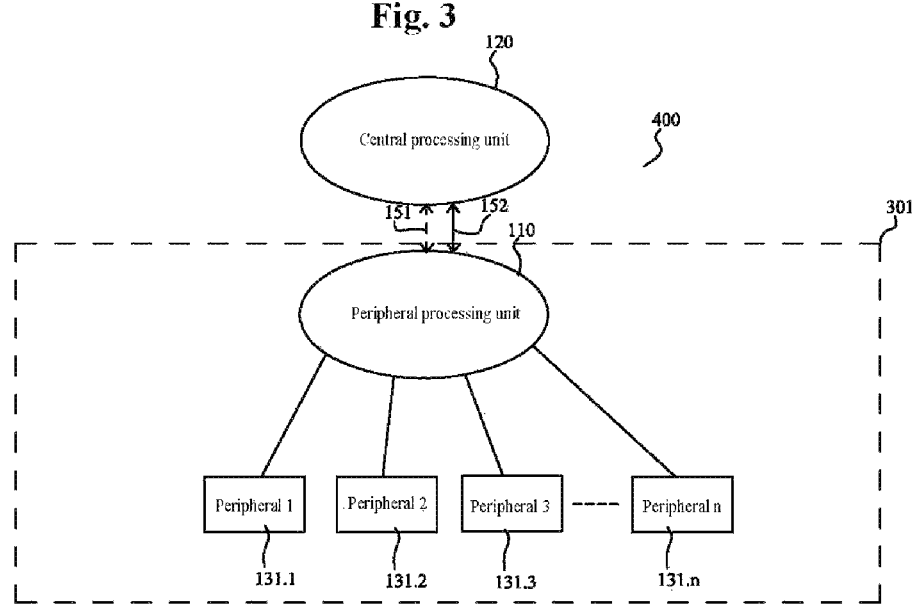
FIG. 4 is a structural schematic diagram showing a communication working system 400 formed according to the present disclosure.

FIG. 4 shows a communication working system 400 of the present disclosure. Like the working system 300, the working system 400 comprises a central processing unit 120 and a peripheral processing unit 110. The central processing unit 120 communicates (wiredly or wirelessly) with the peripheral processing unit 110; however, the central processing unit 120 does not communicate with an Extranet node. In other words, in the working system of the present disclosure, the Intranet 301 and the Extranet 302 may work separately and independently. In the working system shown in FIG. 4, the working system may work independently without the Extranet 302. In the communication working system 400, the central processing unit 120 may communicate with the Extranet node via the peripheral processing unit 110.

Figure 5:
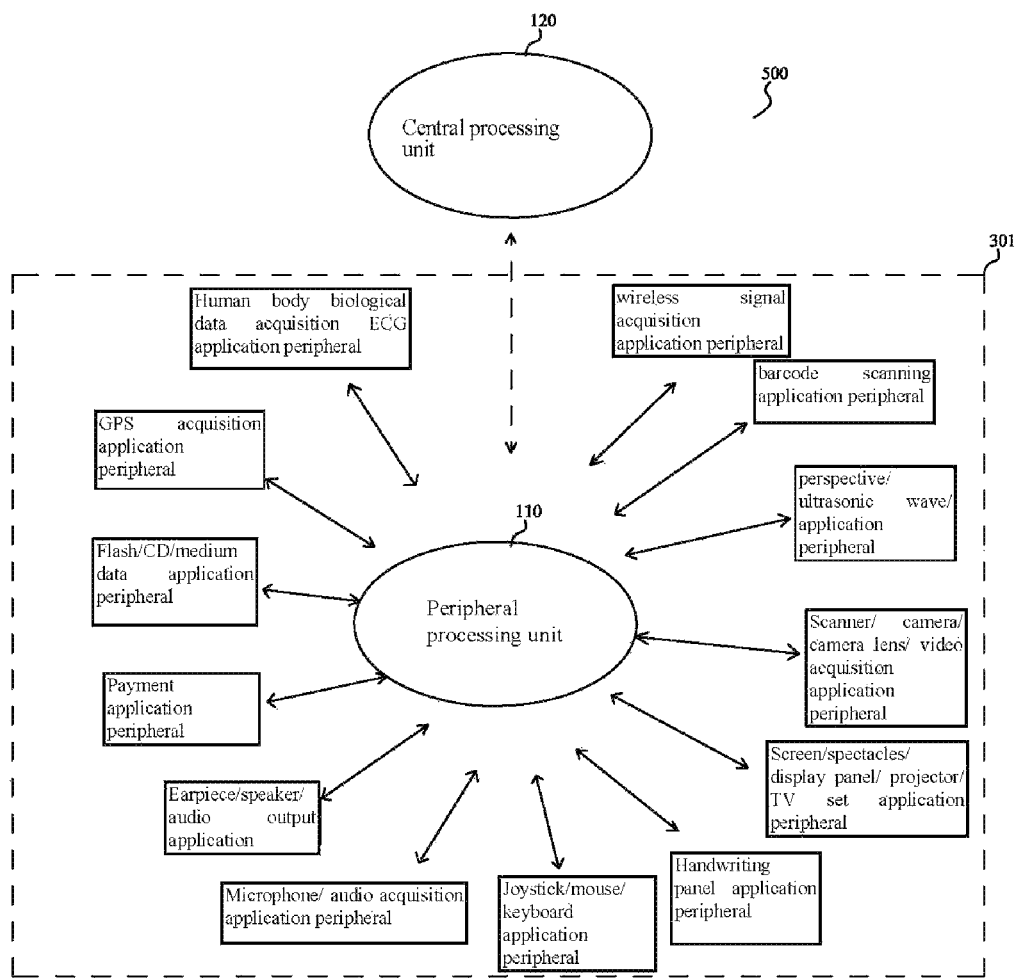
FIG. 5 is a structural schematic diagram showing a communication working system 500 formed according to the present disclosure.

FIG. 5 shows a communication working system 500 of the present disclosure. The central processing unit 120 is connected with a plurality of peripherals with a certain specific function or purpose through the peripheral processing unit 110 (or the peripheral processing service center 110'). The various peripherals include: a human body biological data acquisition ECG application peripheral, a GPS acquisition application peripheral, a flash/CD/medium data application peripheral, a payment application peripheral, an earpiece/speaker/audio output application peripheral a microphone/audio acquisition application peripheral, a joystick/mouse/keyboard application peripheral, a handwriting board application peripheral, a screen/spectacles/display panel/projector/TV application peripheral, a scanner/camera/video camera/video acquisition application peripheral, a perspective/ultrasonic wave/application peripheral, a barcode scanning application peripheral, a radio signal acquisition application peripheral, etc. As needed, the central processing unit 120 may select any combination of a plurality of peripherals.

Figure 6:
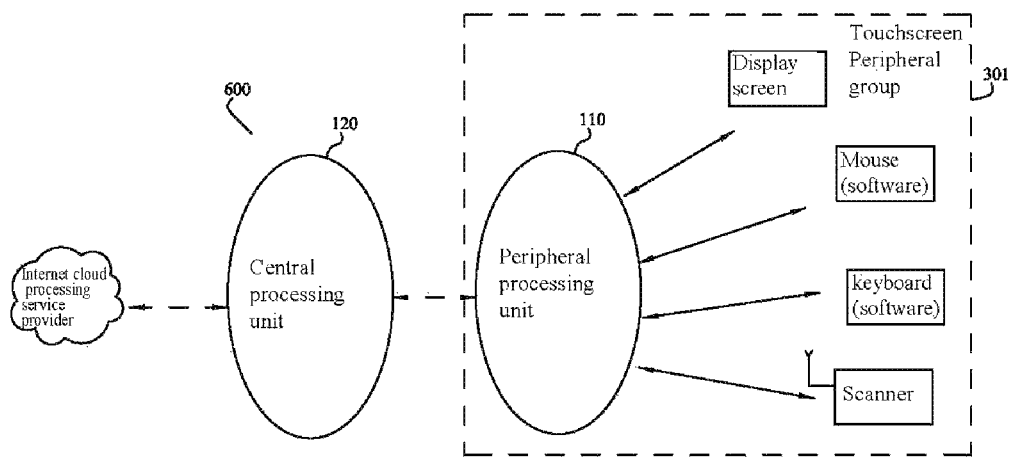
FIG. 6 is a structural schematic diagram showing a communication working system 600 formed according to the present disclosure.

FIG. 6 shows a communication working system 600 of the present disclosure. As illustrated in FIG. 6, a control central processing unit 120 requests the peripheral processing unit 110 for using peripherals (including: a display screen, a mouse, a keyboard, and a scanner); a personal control central processing unit 120, after answering, being paired with, and calling the peripheral processing unit 110, exchanges verification information therewith. The pairing is achieved after the verification passes. After the control central processing unit 120 is paired and connected with the display screen, the mouth peripheral, the keyboard, and the scanner, a communication working system 600 is formed. Via its external communication line 125, the personal control central processing unit 120 communicates with an Internet cloud processor to send a scanned file to the Internet cloud processor for storage.

Figure 7:
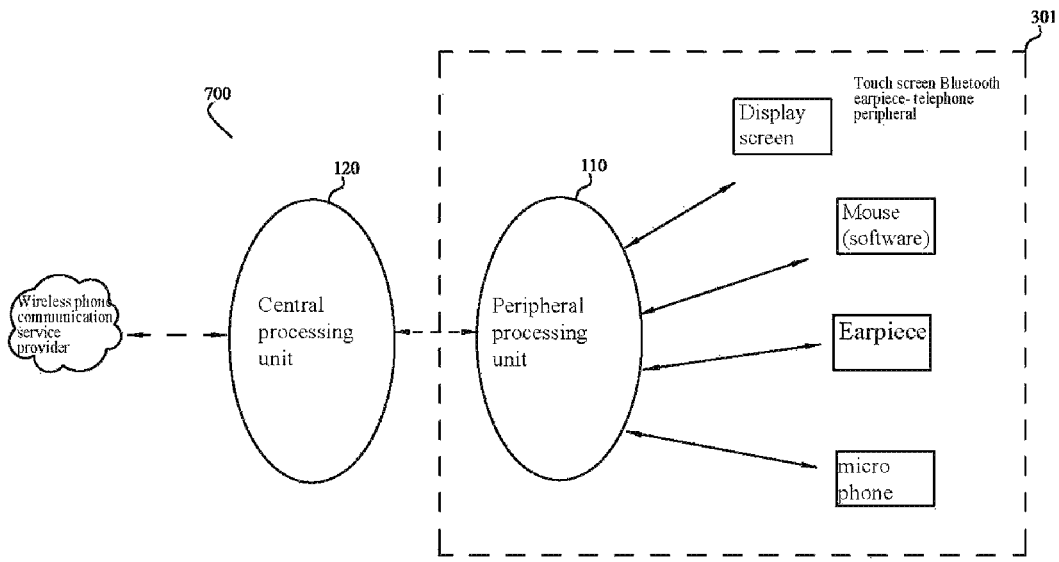
FIG. 7 is a structural schematic diagram showing of a communication working system 700 formed according to the present disclosure.

FIG. 7 shows a communication working system 700 of the present disclosure. As illustrated in FIG. 7, the control central processing unit 120 requests use of peripherals (including: a display screen, a mouse, a keyboard, a microphone, and a receiver) from the peripheral processing unit 110; the control central processing unit 120, after answering, being paired with, and calling the peripheral processing unit 110, exchanges verification information with the peripheral processing unit 110. The pairing is achieved after the verification passes. After the personal control central processing unit 120 is paired and connected with the display screen, the mouse peripheral, the keyboard, the microphone and the receiver, the communication working system 700 is formed. Via its external communication line 125, the control central processing unit 120 is connected with a wireless telephone communication provider to perform a call operation.

Figure 8:
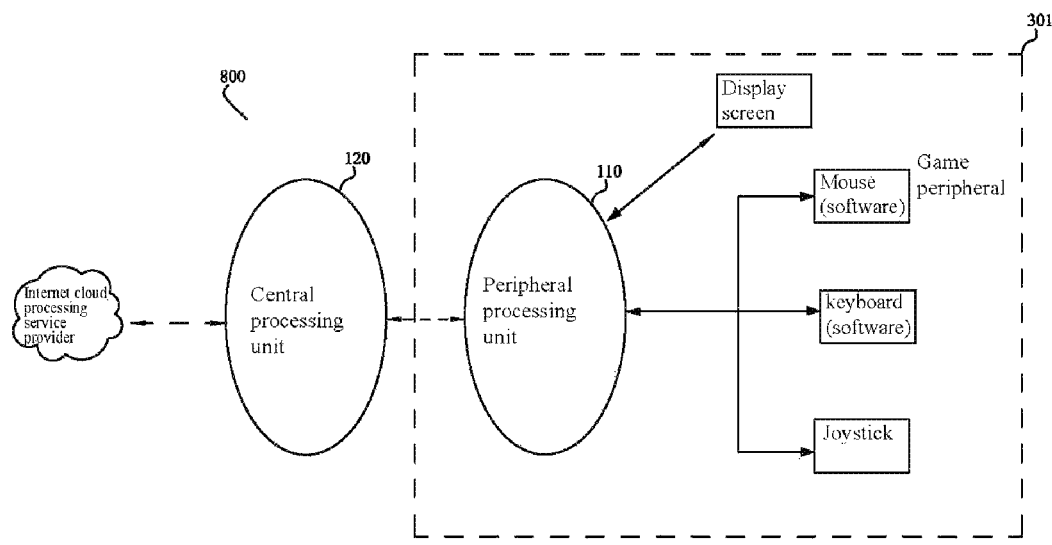
FIG. 8 is a structural schematic diagram showing a communication working system 800 formed according to the present disclosure.

FIG. 8 shows a communication working system 800 of the present disclosure. As illustrated in FIG. 8, the control central processing unit 120 requests peripherals (including: a display screen, a mouse, a keyboard, and a joystick peripheral) from the peripheral processing unit 110. The personal control central processing unit 120, after answering, being paired with, and calling the peripheral processing unit 110, exchanges verification information with the peripheral processing unit 110. The pairing is achieved after the verification passes. After the control central processing unit 120 is paired and connected with the display screen, the mouse peripheral, the keyboard, and the joystick peripheral, the communication working system 800 is formed. Via its external communication line 125, the control central processing unit 120 is connected with an Internet cloud processor to perform a game play operation.

Figure 9A:
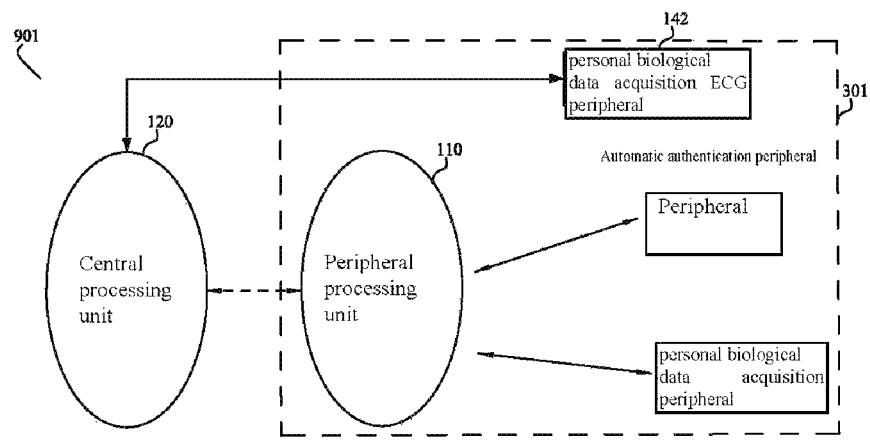
FIG. 9A is a structural schematic diagram showing a communication working system 901 formed according to the present disclosure.

FIG. 9A shows a communication working system 901 of the present disclosure. As illustrated in FIG. 9A, the control central processing unit 120 requests use of security authentication peripherals (including a personal biological data acquisition ECG peripheral, a human body biological data acquisition peripheral, and an automatic authentication peripheral) from the peripheral processing unit 110, so as to establish a fast, highly secure and reliable combination of pairing and authenticating the peripherals. For example, firstly, a human body biological data acquisition peripheral is paired with a personal control center of a machine owner to acquire biological data (biological information such as heart rate, oxygen content in blood, ECG waveform, and fingerprint) of the owner, the biological data being analyzed and recorded to form a biological fingerprint of the owner; when an operator (the owner) holds/contacts other peripheral inbuilt with the human body biological data acquisition ECG peripheral, the human body biological data of the operator may be acquired and fed into the control central processing unit which analyzes and detects the data to compare with the stored biological fingerprint or even may compare them with real-time data; after confirmation of consistency, the control central processing unit may automatically accept the request for adding the peripheral. This set of hardware may form a set (periphery+human body biological data acquisition peripheral+battery) of automatically paired security peripheral group. This function may be applied to fields such as online payment, secure check-in, etc. Immediate use may be realized when the personal control center user picks up a peripheral, and the user even may continue to finish a novel or a program from the part just stopped. For a need of a higher level of confidential information, it is always needed to verify a user's authenticity more accurately in fields of finance, security, and national defense; at this point, electrocardiogram information of Sanyinjiao acupoint at a user's ankle part may be acquired by a personal information acquisition peripheral closely matched with the personal control center, because the human body data volume of Sanyinjiao is larger, more accurate, more hidden, and more convenient to wear the acquisition device peripheral than other parts. When the user touches by hand the functional peripheral that needs to be matched, the functional peripheral may acquire the user's body information by contact with the user's skin, compare with the real-time data acquired by the personal control center, and then decisively and correctly determine whether the person who touches is just the same person who carries the personal control center, thereby achieving a higher-level identification and authentication.

Figure 9B:
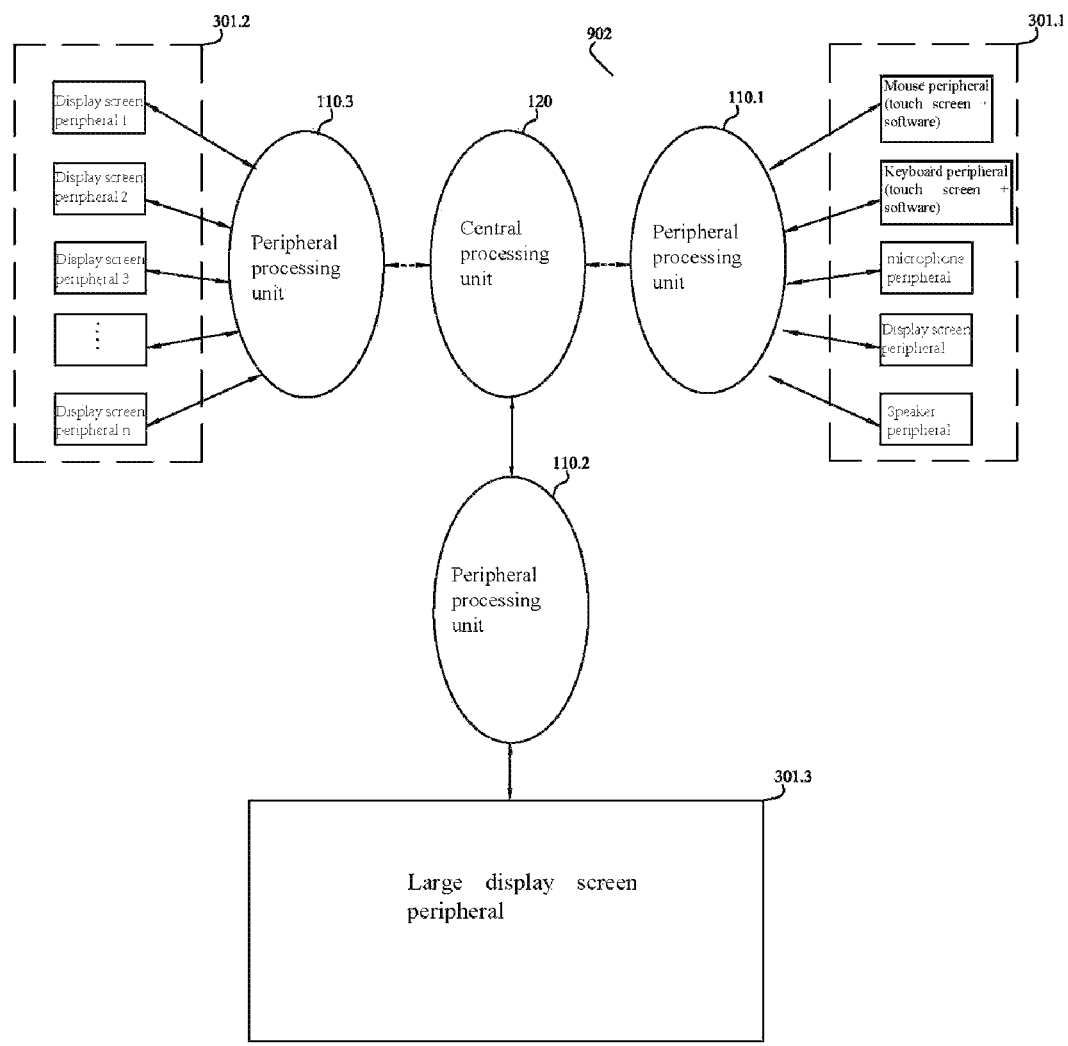
FIG. 9B is a structural schematic diagram showing a communication working system 902 formed according to the present disclosure.

FIG. 9B shows a communication working system 902 of the present disclosure, illustrating a working system in which the control central processing unit 120 is simultaneously connected to a plurality of peripheral processing units 110.1, 110.2, and 110.3. As illustrated in FIG. 9B, a lecturer carrying the control central processing unit 120 requests use of lecture peripherals (including a mouse, a keyboard, a loudspeaker, a private display screen) from the peripheral processing unit 110.1; when the lecturer's control central processing unit 120 is connected with the mouse, keyboard, loudspeaker, and private display screen peripheral, a presentation work peripheral group is formed. The lecturer may also use the central processing unit 120 to request use of class audience peripherals (including a large display screen for the audience) from the peripheral processing unit 110.2; when the lecturer's control central processing unit 120 is connected to the large display screen peripheral for the audience, a class audience peripheral group is formed. The lecturer may further use the control central processing unit 120 to request use of remote audience peripherals (including remote display peripheral 1, display peripheral 2, . . . , display peripheral n) from the peripheral processing unit 110.3; when the lecturer's control central processing unit 120 is connected to the remote display peripheral 1, display peripheral 2, . . . , display peripheral n, a remote audience peripheral group is formed. Through the peripheral processing unit 110.1, the peripheral processing unit 110.2, and the peripheral processing unit 110.3, the lecturer's control central processing unit 120 forms a communication working system 900, such that the lecturer may perform a lecture operation.

Figure 9C:
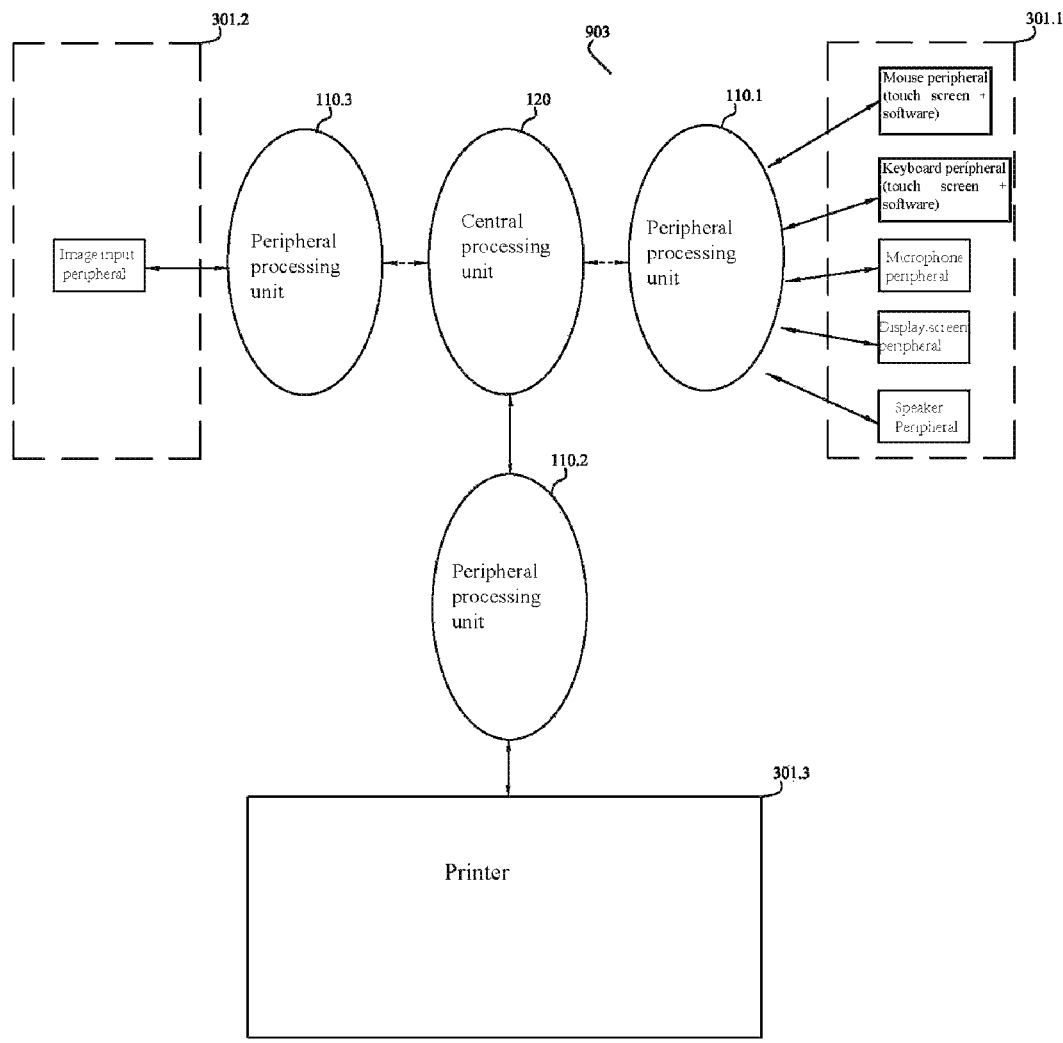
FIG. 9C is a structural schematic diagram showing a communication working system 903 formed according to the present disclosure.

FIG. 9C shows a working system 903 of the present disclosure, illustrating a working system in which the control central processing unit 120 is simultaneously connected to a plurality of peripheral processing units 110.1, 110.2, and 110.3. As illustrated in FIG. 9C, the central processing unit 120 requests use of basic peripherals (including the mouse, the keyboard, the microphone, the speaker, and the display screen) from the peripheral processing unit 110.1; after the central processing unit 120 is connected to the mouse, the keyboard, the microphone, the speaker, and the display screen peripheral, a basic working peripheral group is formed. The central processing unit 120 may also request use of a printer peripheral from the peripheral processing unit 110.2; after the central processing unit 120 is connected with the printer peripheral, the working system 902 has a print function. The central processing unit 120 may further request an image input peripheral from the peripheral processing unit 110.3; after the central processing unit 120 is connected to the image input peripheral, the working system 902 has an image input function. Through the peripheral processing unit 110.1, the peripheral processing unit 110.2, and the peripheral processing unit 110.3, the central processing unit 120 forms a communication working system 902, and the user may perform printing and image input operations. In FIG. 9C, the central processing unit 120 simultaneously communicates with the three peripheral processing units 110.1, 110.2, and 110.3. With this setting, the three peripheral processing units 110.1, 110.2, and 110.3 have their own peripheral processing unit IDs, for being paired with the central processing unit 120.

Figure 9D:
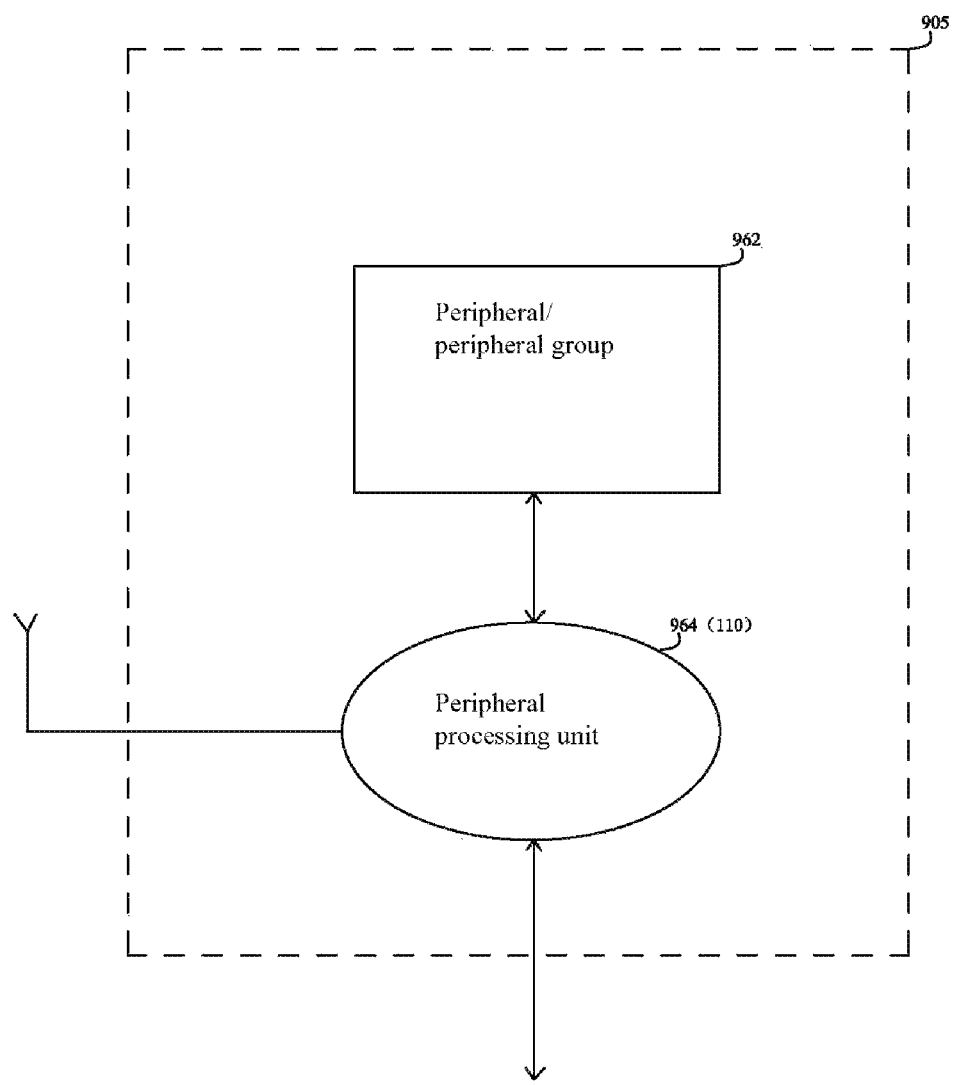
FIG. 9D is a structural schematic diagram showing a peripheral integrated unit 905 formed according to the present disclosure.

FIG. 9D shows a peripheral integrated unit 905. As shown in FIG. 9D, the peripheral integrated unit 905 comprises a single peripheral or peripheral group 962 and a peripheral processing unit 964 (or 130). The peripheral may be a printer peripheral, a scanner peripheral, or an image input peripheral; the peripheral group may be a group of devices, e.g., a mouse, a keyboard, a microphone, a speaker, and a display screen peripheral. The peripheral integrated unit 905 may have its own unique peripheral ID for identifying the peripheral integrated unit 905. The structure and function of the peripheral processing unit 964 are identical or similar to those of the peripheral processing unit 110 in FIG. 1. The peripheral integrated unit 905 shown in FIG. 9D may communicate with any central processing unit 120. The structure of the peripheral integrated unit 905 has a benefit that later, a peripheral manufacturer may specifically configure a peripheral processing unit 964 (or 110) for any manufactured peripheral or a group of peripherals, pre-set the ID, peripheral parameters, peripheral invoking commands, peripheral communication protocols and instructions of the peripheral integrated unit 905. After purchasing any kind of peripheral or any group of peripherals, the user may set the parameters, invoking commands, and communication protocols for the central processing unit 120 according to the instructions of the peripheral, such that the central processing unit 120 may communicate with the peripheral integrated unit 905, thereby being capable of using the peripheral or peripheral group. Such modularized settings enable the central processing unit 120 to be conveniently connected with any kind of individually manufactured peripheral or peripheral group.

FIG. 10A shows a system 1001 that is open to multiple users and provides multiple peripherals. As shown in FIG. 10A, a peripheral processing service center 110' may be provided with one or more servers and equipped with a plurality of peripherals, for providing services to a plurality of central processing units 120 (120.1, 120.2, ..., 120.m).

FIG. 10B shows a system 1002 having a plurality of peripheral processing units 110 (or peripheral processing service centers 110'). The plurality of peripheral processing units 110 (or peripheral processing service centers 110') may be distributed among different locations, different cities, or different countries, as long as they are located within a certain range, the control central processing unit 120 may access any peripheral processing unit 110 (or peripheral processing service center 110') and obtain the peripheral service provided thereby.

Figure 10C:
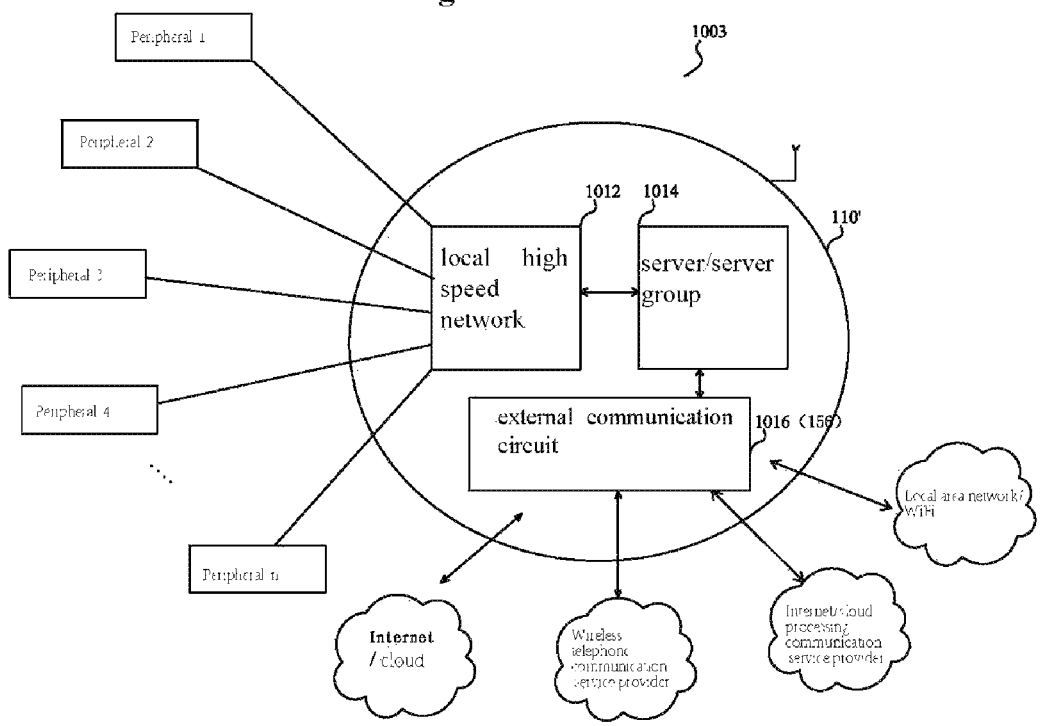
FIG. 10C is an internal structural diagram showing a working system 1003 formed according to the present disclosure.

FIG. 10C shows a more specific structure 1003 in the peripheral processing service center 110'. As shown in FIG. 10C, the peripheral processing service center 110' comprises a server/server group 1014', a local high-speed network 1012, and an external communication circuit 1016. Under the control of the server/server group 1014, the local high-speed network 1012 is connected to a peripheral 1, a peripheral 2, ..., a peripheral n; the server/server group 1014 manages and assigns the peripheral 1, the peripheral 2, ..., the peripheral n to the central processing unit 120 (120.1, 120.2, ..., 120.m). Under the control of the server/server group 1014, the peripheral processing service center 110' can indirectly communicate with the wireless telephone communication server, and a networking/cloud processing service provider, a local area network, and a WiFi or the like, thereby providing wireless telephone communication, networking/cloud processing, local area network service, and WiFi service to the central processing unit (120.1, 120.2, ..., 120.m). In this way, the central processing unit 120 (120.1, 120.2, ..., 120.m) may omit its external communication line 125 (see FIG. 1), thereby further simplifying the circuit of the central processing unit 120 (120.1, 120.2, ..., 120.m).

Figure 11:
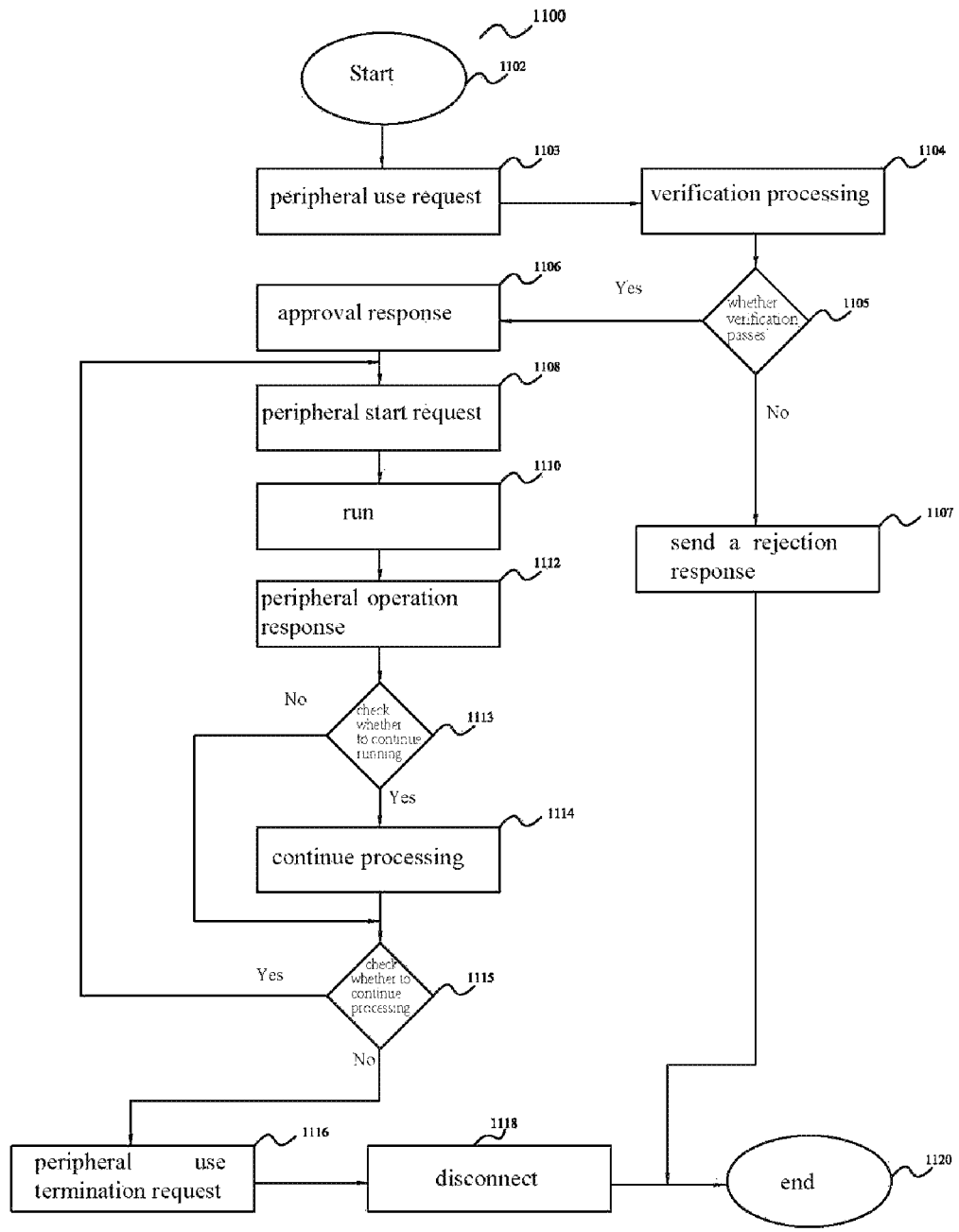
FIG. 11 is a flow diagram 1100 of operating a novel communication working system 100 according to the present disclosure.

FIG. 11 shows a flow diagram 1100 for operating a personal communication working system 100 according to the present disclosure.

Step 1103: after turning to step 1103 from the starting step 1102, a certain central processing unit 120 issues a peripheral use request to a nearby peripheral processing unit 110 (or peripheral processing service center 110'). When a central processing unit 120 is to use a peripheral 131 (131.1, 131.2, ..., 131.n) in the peripheral processing unit 110 (or peripheral processing service center 110') as shown in FIG. 1 or FIGS. 10A-C, the central processing unit 120 issues a peripheral use request to the peripheral processing unit 110 via its central communication circuit 122, the peripheral use request including the central processing unit ID. The IDs of the central processing units 120 are stored in the ID line (or memory) 101, each of the central processing units 120 having a unique (or peculiar) ID (e.g., using an IP address or a telephone number). Before the central processing unit 120 issues the peripheral use request to the peripheral processing unit 110, the central processor 121 retrieves its ID from the central ID circuit (or memory) 123 and feeds it to the central communication circuit 122, so as to issue the peripheral use request to the peripheral processing unit 110 (or peripheral processing service center 110'). The peripheral use request includes a start signal and an end signal; the peripheral use request further includes a plurality of information segments (including the nature of the request), the plurality of information segments being included between the start signal and the end signal, facilitating the peripheral processing unit 110 to capture the information between the start signal and the end signal.

Step 1104: the peripheral processing unit 110 (or peripheral processing service center 110') performs an approval processing. When the central processing unit 120 is located within a certain range of the peripheral processing unit 110 (or peripheral processing service center 110'), the peripheral processing unit 110 (or peripheral processing service center 110') receives a peripheral use request (including its ID) from the central processing unit 120 via its peripheral communication circuit 102, and the ID of the central processing unit 120 and the peripheral use request are fed to its peripheral processor 111. If the peripheral processing unit 110 (or peripheral processing service center 110') is a closed system (which only provides services to a pre-registered central processing unit), the peripheral processing unit 110 checks whether a user table 201 (see FIG. 2A) pre-stores the received ID; if the received ID is not found, the peripheral processing unit 110 (or peripheral processing service center 110') rejects the peripheral use request; if the received ID is found in the user table 201, the peripheral processing unit 110 (or peripheral processing service center 110') (after verifying password information with the user) preliminarily approves the peripheral use request. If the peripheral processing unit 110 is an open system (and provides services to any central processing unit), the peripheral processing unit 110 (or peripheral processing service center 110') preliminarily approves the peripheral use request without checking the user table 201. After preliminarily approving the peripheral use request, the peripheral processor 111 checks a peripheral usage status table 202 (see FIG. 2B) and/or the peripheral group usage status table 203 (see FIG. 2C) to determine whether an idle peripheral 131 (131.1, 131.2, ..., 131.n) exists. If there exists no idle peripheral 131 (131.1, 131.2, ..., 131.n) (i.e., all cells in the first column of the usage status table 202 of the peripheral or the first column of the usage status table 203 of the peripheral are filled with IDs; or all peripherals are in a working state), the peripheral processor 111 will reject the peripheral use request; if there exists an idle peripheral 131 (131.1, 131.2, ..., 131.n), the peripheral processor 111 will approve the peripheral use request.

Step 1105: the peripheral processing unit 110 (peripheral processing service center 110') performs a verification judgment. If the verification passes, turn to step 1006 to perform a peripheral request approved response; if the verification fails, turn to step 1107 to send a peripheral request rejected response to the central processing unit 120, and then turn to step 1120 to end the procedure.

Step 1106: the peripheral processing unit 110 (or peripheral processing service center 110') issues a peripheral request approved response. After the peripheral use request is approved, the peripheral processor 111 retrieves its peripheral ID from the peripheral ID circuit (or memory) 101, and issues the peripheral use request approved response to its peripheral communication circuit 102. The use request approved response includes a start signal and an end signal, as well as a plurality of information segments (including the nature of the response), the plurality of information segments being included between the start signal and the end signal, facilitating the central processing unit 120 to capture the response information between the start signal and the end signal. The request approved response includes the ID of the peripheral processing unit 110 (or peripheral processing service center 110'), the ID of the central processing unit 120 (for indicating the central processing unit 120 receiving the peripheral request approved response) and the ID of an available peripheral or the ID of an available peripheral group. Before issuing the request response, the peripheral processing unit 110 may change the available peripheral in FIG. 2B or the available peripheral group in FIG. 2C into a locked state to forbid them from being affected by other central processing units 120. If the peripheral processing unit 110 (or peripheral processing service center 110') rejects the peripheral use request of the central processing unit 120, the peripheral processing unit 110 (or the peripheral processing service center 110') also notifies, via a wireless communication, the central processing unit 120 of rejection reasons for its peripheral use request.

Step 1108: the central processing unit 120 issues a peripheral start request. After receiving the request approved response, the central processor 121 in the central processing unit 120 checks whether the central ID of the request approved response is consistent with its own ID; in the case of consistency, captures the content in the request approved response; in the case of inconsistency, discards the content in the request approved response. When the ID in the request response is consistent with its own ID, the central processor 121 displays the ID of the available peripheral or the ID of the available peripheral group, as well as the name of the available peripheral, on its central operation display device 124. In this case, the user may select an available peripheral or an available peripheral group through the peripheral operation display device 124. The selection function of the peripheral group enables the central processing unit 120 to select all devices in the peripheral group with one peripheral request issued to the peripheral processing unit 110 (or peripheral processing service center 120'). In this way, the peripheral processing unit 110 (or peripheral processing service center) may combine the peripherals in an optimized use manner. Without the function of group selection, when a plurality of 110 (110.1, 110.2, ..., 110.n) communicate with one peripheral processing unit 110 (or peripheral processing service center 110'), it would be hard for a certain central processing unit 120 to select an optimized peripheral combination. Before the central processing unit 120 issues a peripheral start request, the ID of the peripheral processing unit (or peripheral processing service center) is filled in the table 204, and the peripheral ID (or peripheral group ID) and the requested content (i.e., a start request) are filled in the corresponding row. Then, the central processing unit 120 issues the peripheral start request through its central communication circuit 122. The peripheral start request includes a start signal and an end signal, as well as a plurality of information segments (including the nature of the request) included between the start signal and the end signal, facilitating the peripheral processing unit 110 to capture the information between the start signal and the end signal. The peripheral start request includes the ID of the peripheral processing unit 110 (or peripheral processing service center 110'), the ID of its own (the ID of the central processing unit 120), the ID of the selected peripheral or the ID of the peripheral group, an operation command and/or data.

Step 1110: executing the operation command and/or data issued by the central processing unit 120 in the peripheral processing unit 110 (or the peripheral processing service center 110'). After receiving the peripheral start request, the peripheral processing unit 110 checks whether the ID of the peripheral processing unit 110 (or peripheral processing service center 110') in the peripheral start request is consistent with its own ID; in the case of consistency, captures the content in the peripheral start request; in the case of inconsistency, discards the content in the peripheral start request. After the peripheral processing unit 110 (or peripheral processing service center 110') determines to receive the peripheral start request, its peripheral processor 111 captures from the peripheral start request, the ID of the central processing unit 120, the ID of the selected peripheral or the ID of the peripheral group, an operation command and/or data; and uses the selected peripheral or peripheral group to process data according to the operation command (or separately execute the operation command). Before executing the operation processing, the peripheral processing unit 110 changes the selected peripheral or peripheral group in the corresponding central processing unit 120 ID row in the work status table 202 or 203 from the locking state into the working state, and changes the unselected peripheral or peripheral group from the locked state into the idle state.

Step 1112: the peripheral processing unit 110 (or peripheral processing service center 110') issues a peripheral operation response. After obtaining the operation processing result, the peripheral processing unit 110 issues a peripheral operation response through its peripheral communication circuit 102. The peripheral operation response includes a start signal and an end signal, as well as a plurality of information segments (including the nature of the request) included between the start signal and the end signal, facilitating the peripheral processing unit 110 to capture the information between the start signal and the end signal; the peripheral operation response includes a peripheral ID of the peripheral processing unit 110 (or peripheral processing service center 110'), the ID of the central processing unit 120, and the peripheral operation processing result.

Step 1113: the central processing unit 120 determines whether to continue further processing the operation result. After receiving the peripheral operation response, the central processor 121 in the central processing unit 120 checks whether the central processing unit ID in the peripheral operation response is consistent with its own ID; in the case of consistency, captures the content in the peripheral operation response; in the case of inconsistency, discards the information in the peripheral operation response. When the central processing unit ID in the request response is consistent with its own ID, the central processor 121 determines whether it is necessary to further process the operation result of the peripheral. According to the peripheral processing unit (or peripheral processing service center) ID, the central processor 121 in the central processing unit 120 may determine the operation result of which peripheral unit 110 (or the peripheral processing service center 110') to receive, and the operation result corresponding to which specific peripheral result by checking the usage status (or status tracking) table 204 of the peripheral process unit (or peripheral processing service center). With the ID of the peripheral processing unit (or peripheral processing service center), the central processing unit 120 may communicate and connect simultaneously with a plurality of peripheral units 110 (or the peripheral processing service centers 110'). If the operation result sent from the peripheral unit 110 (or peripheral processing service center 110') does not need to be further processed, turn to step 1115; if it needs to be further processed, turns to step 1114.

Step 1114: the central processing unit 120 continues to process the operation result. For example, if the operation result needs to access an external node (e.g., the Internet), the central processor 121 accesses the Internet for processing via its external communication line 125.

Step 1115: the central processing unit 120 determines whether it is necessary to further use the peripherals 131 (131.1, 131.2, ..., 131.n) in the peripheral processing unit 110 (or peripheral processing service center 110') with the peripheral processing unit (or peripheral processing service center) ID. If it is necessary to continue using the peripherals 131 (131.1, 131.2, ..., 131.n) in the peripheral processing unit 110, the operation turns to step 1108 to issue a new peripheral start request; if it is not necessary to continue using the peripherals 131 (131.1, 131.2, ..., 131.n) in the peripheral processing unit 110, the operation turns to 1116.

Step 1116: the central processing unit 120 issues a Peripheral Use Termination request. When one central processing unit 120 intends to terminate use of the peripherals 131 (131.1, 131.2, ..., 131.n) in the peripheral processing unit 110 (or the peripheral processing service center 110') shown in FIG. 1 or FIGS. 10A-B, the central processing unit 120 issues a Peripheral Use Termination request to the peripheral processing unit 110 (or peripheral processing service center 110'), and the Peripheral Use Termination Request includes the ID of the peripheral unit (or peripheral processing service center) and its own ID (i.e., central processing unit ID). The Peripheral Use Termination request includes a start signal and an end signal; the Peripheral Use Termination request further includes a plurality of information segments (including the nature of the request), the plurality of information segments being included between the start signal and the end signal, facilitating the peripheral processing unit 110 to capture the information between the start signal and the end signal. Before issuing the Peripheral Use Termination request, the central processing unit 120 eliminates the ID of the corresponding peripheral unit 110 (or the peripheral processing service center 110') from the table 204, indicating that the peripheral processing unit 110 (or the peripheral processing service center 110') will not be used any longer. If the response from the peripheral unit 110 (or the peripheral processing service center 110') is received later, because the ID of the peripheral unit 110 (or the peripheral processing service center 110') cannot be found from the table 204, the central processing unit 120 will not perform any processing to the response.

Step 1118: The peripheral processing unit 110 (or the peripheral processing service center 110') disconnects the communication with the central processing unit 120. After receiving the Peripheral Use Termination request issued by the central processing unit 120, the peripheral processor 111 in the peripheral processing unit 110 checks whether the ID of the peripheral unit (or peripheral processing service center) involved in the Peripheral Use Termination request is consistent with its own ID; in the case of consistency, captures the content in the Peripheral Use Termination request; in the case of inconsistency, discards the content in the Peripheral Use Termination request. After determining to receive the Peripheral Use Termination request, the peripheral processing unit 110 feeds the ID of the central processing unit 120 and the Peripheral Use Termination request to the peripheral processor 111. The peripheral processor 111 removes the ID of the central processing unit 120 from the corresponding row in the Peripheral Usage status table 202 (see FIG. 2B) and/or the Peripheral Group Usage status table 203 (see FIG. 2C), changes the status in the corresponding row in the corresponding Peripheral Usage status table 202 (see FIG. 2B) and/or the Peripheral Group Usage status table from the working state into the idle state, and releases the peripherals and/or peripheral groups in the corresponding row, such that other central processing units may use these released peripherals and/or peripheral groups. The peripheral processor 111 then turns the operation to the end step 1120. At step 1120: the operation procedure ends.

After the ID of the central processing unit 120 is removed from the Peripheral Usage status table 202 (see FIG. 2B) and/or the Peripheral Group Usage status table 203 (see FIG. 2C), if the central processing unit 120 sends a Peripheral Use request to the peripheral processing unit 110 again, the peripheral processor 111 will not find the ID of the central processing unit 120 any longer in the Peripheral Usage status table 202 (see FIG. 2B) and/or the Peripheral Group Usage status table 203 (see FIG. 2C). Therefore, the peripheral processing unit 110 sends a rejection response to ask the central processing unit 120 to resend the peripheral use request, such that the peripheral processing unit 110 re-performs an approval processing in step 1105.

To keep communication connection with the peripheral processing unit 110, the central processing unit 120 periodically issues a communication maintaining request to the peripheral processing unit 110 (or peripheral processing service center 110') via its central communication circuit 122. The communication maintaining request includes a start signal and an end signal, and a plurality of information segments (including the nature of the request, the ID of the peripheral processing unit (or peripheral processing service center 110') and the ID of the central processing unit 120), the plurality of information segments being included between the start signal and the end signal, facilitating the peripheral processing unit 110 (or peripheral processing service center 110') to capture the request information between the start signal and the end signal. In the state of maintaining communication, the central processing unit 120 and the peripheral processing unit 110 maintain a communication state, such that in the next mutual communication, the approval operation will not be needed.

Therefore, after the peripheral use request is granted to a certain central processing unit 120, the peripheral processing unit 110 (or peripheral processing service center 110') periodically inquires and receives the communication maintaining request sent from the central processing unit 120. If the communication maintaining request is received from the central processing unit 120 within a prescribed time period, the peripheral processing unit 110 (or peripheral processing service center 110') continues maintaining a communication channel with the central processing unit 120; if the communication maintaining request is not received from the central processing unit 120 within a prescribed time period (possibly because the central processing unit 120 leaves, or is turned off, or the communication is artificially disconnected), the peripheral processing unit 110 (or the peripheral processing service center 110') disconnects the communication channel with the central processing unit 120 and updates the status in the corresponding row in the table of FIG. 2A or 2B to set the peripheral or peripheral group used by the peripheral processing unit 110 into an idle state to be available for other central processing units to use the released peripheral or peripheral group. If the central processing unit 120 is to reuse the peripheral in the peripheral processing unit 110 later, the process will re-start from the approval step.

In FIG. 10A, a plurality of central processing units 120 (120.1, 120.2, ..., 120.m) and a peripheral processing service center 110' (or peripheral processing unit 110) form a working system 1001. In the working system shown in FIG. 10A, upon start, each central processing unit 120 (120.1, 120.2, ..., 120.m) constantly and automatically issues a peripheral use request (including its ID) to the peripheral processing service center 110' (or peripheral processing unit 110) via the peripheral communication circuit 102. As long as the peripheral use request from the central processing unit 120 (120.1, 120.2, ..., 120.m) is received, the peripheral processing service center 110' (or the peripheral processing unit 110) automatically enters the initial processing program, and displays the ID of the central processing unit 120 on one display screen thereof, the privilege of the central processing unit 120 to use the peripheral processing unit 110, and the peripheral situation of the peripheral processing service center 110' (or the peripheral processing unit 110). Because of facing each of a plurality of central processing units 120 (120.1, 120.2, ..., 120.m) and having a plurality of peripherals, the peripheral processing service center 110' of FIG. 10A may be provided with one or more peripheral processing servers (or peripheral processing server groups), and the peripheral processing service center may use a high-speed local network to connect with the plurality of peripherals (see FIG. 10C), so as to manage the communication between the plurality of central processing units 120 (120.1, 120.2, ..., 120.m) and the plurality of peripherals. The working system 1001 of FIG. 10A is particularly suitable for public places, e.g., airports, railway stations, hotels, restaurants, ports, etc.

In FIG. 10B, one central processing unit 120 and a plurality of peripheral processing units or peripheral processing service centers 110 (110.1, 110.2, ..., 110.n) form a working system 1002. Each peripheral processing center 110 may be disposed at a different location. At each location the central processing unit 120 may use the peripheral processing unit 110 at the location. In the working system 1001 shown in FIG. 10B, after each central processing unit 120 (120.1, 120.2, ..., 120.m) is started, the central processing unit 120 ((120.1, 120.2, ..., 120.m) constantly and automatically issues a peripheral use request (including its ID) via the peripheral communication circuit; meanwhile, the data collector 142 acquires password information from the user, and sends it, along with the Peripheral Use request, to the peripheral processing unit or the peripheral processing service center 110. As long as the Peripheral Use request from the central processing unit 120 (120.1, 120.2, ..., 120.m) is received, the peripheral processing unit or the peripheral processing service center automatically enters the initial processing process, and verifies the password information of the user; after the password information is verified, one display screen thereof displays the ID of the central processing unit 120, the privilege of the central processing unit 120 to use the peripheral processing unit 110, and the peripheral condition of the peripheral processing unit 110.

The program shown in FIG. 11 may be stored in the memory 106 or 126 as shown in FIG. 1 and executed by the peripheral processing unit 110 or the central processing unit 120. The program shown in FIG. 11 may also be stored in the memory 2504, 2506, 2604, or 2606 of FIGS. 25-26.

For the working system of the present disclosure, when a new peripheral or a new-model Extranet node emerges, it is unnecessary to change the hardware of the existing central processing unit 120, and only the corresponding parameters and/or commands need to be simply set for the newly unveiling peripheral in the central management operating system and program. Of course, the peripheral management operating system and program in the peripheral processing unit 110 as well as the peripheral interface circuit also need to be correspondingly updated.

Figure 12:
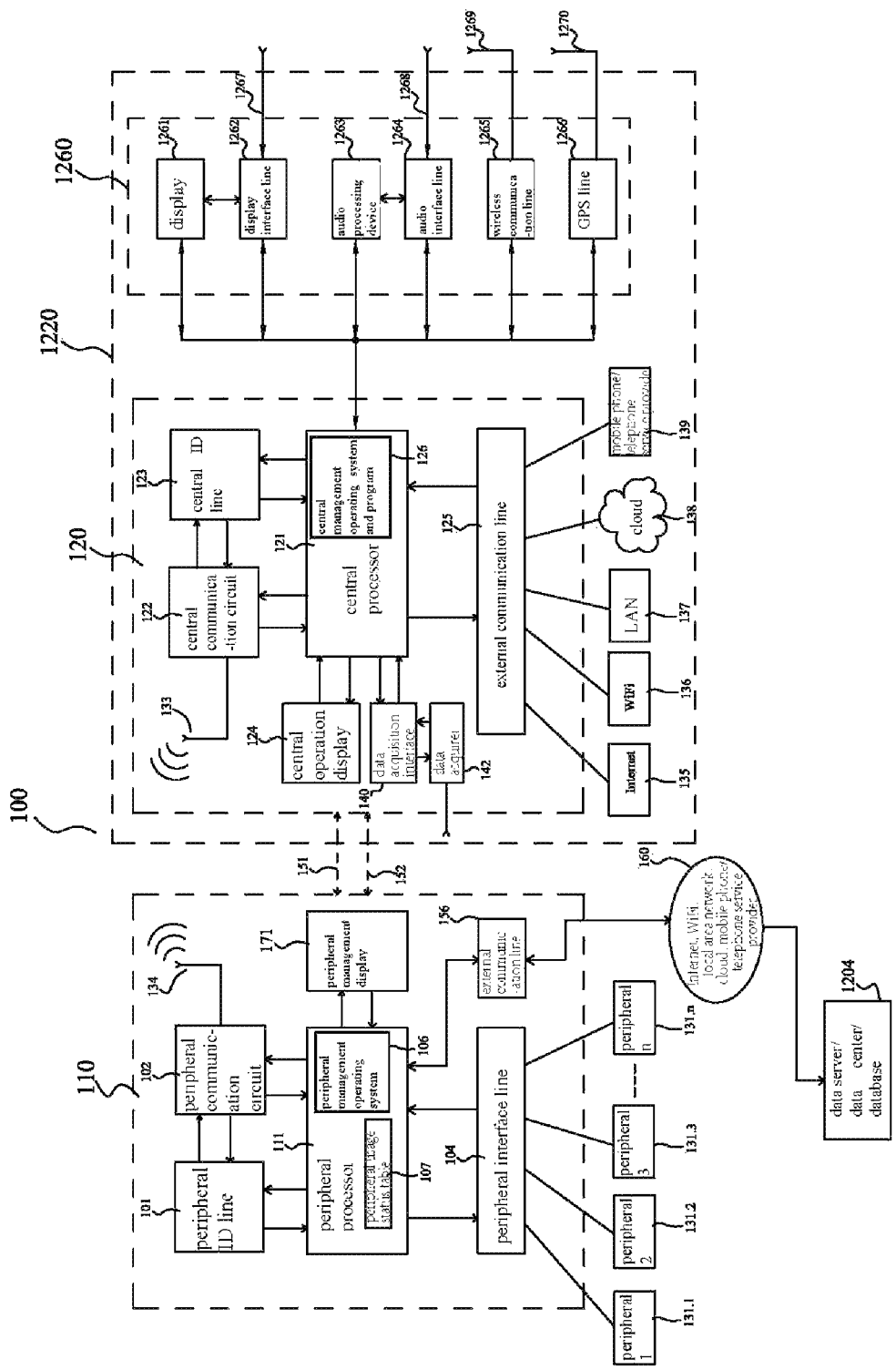
FIG. 12 is another embodiment 1200 of a novel communication working system of the present disclosure.

FIG. 12 shows another embodiment 1200 of a novel communication working system of the present disclosure. In the communication working system 1200, all components identical to those in FIG. 1 use the same reference numerals; while for the components with the same reference numerals in FIG. 12 and FIG. 1, unless otherwise needed, no repeated depictions will be made when describing FIG. 12.

Compared with the communication working system 100 as shown in FIG. 1, the working system 1200 as shown in FIG. 12 includes the peripheral processing unit as shown in FIG. 1 and an extended central processing unit 1220; while the extended central processing unit 1200 includes a central processing unit 120 and a mobile phone module 1260 shown in FIG. 1. The mobile phone module 1260 comprises: a display device (including a display screen) 1261 connected with a display interface circuit 1262; an audio device (e.g., a loudspeaker and a microphone) 1263 connected to an audio interface circuit 1264; a wireless communication line 1265 for receiving/emitting a communication signal in compliance with a communication protocol (e.g., a CDMA or GSM protocol); a GPS (or positioning) line 1266, for receiving a positioning signal emitted from a positioning satellite so as to indicate the location and movement of the extended central processing units 191. In the embodiment of FIG. 121, the central operation display device 124 in the central processing unit 120 may be omitted and replaced by a display device 1261.

The central processor 121 in the central processing unit 120 is connected to the display device (e.g., a display screen) 1261, the interface circuit 1262, the audio device 1263, the audio interface circuit 1264, the wireless communication line 1265, and the GPS 1266 circuit. The display device (e.g., a display screen) 1261, the display interface circuit 1262, the audio device 1263, the audio interface circuit 1264, the wireless communication line 1265, and the GPS 1266 circuit work under the control of the central processor 121.

Specifically, when displaying an image and/or text, the central processor 121 transmits the image and/or text signal to the display interface circuit 1262, and correspondingly controls the display device 1261 and the display interface circuit 1262, so as to display the image and/or text signal on the display device 1261. When playing an audio, the central processor 121 transmits the audio signal to the audio interface circuit 1264, correspondingly controls the audio device 1263 and the audio interface circuit 1264, and plays the audio signal on the audio device 1263.

When receiving the audio signal inputted by the user of the (extended) central processing unit 191 (with a mobile phone function), the audio interface circuit (e.g., a microphone) 1264 receives the audio signal inputted by the user via the input port 1268, converts the user's voice into an audio electrical signal, and subsequently transmits the audio electrical signal to the central processor 121; then the central processor 121 performs corresponding processing to the audio electrical signal, and converts the audio electrical signal into a communication signal in conformity with the CDMA, WCDMA, or GSM protocol. The processed audio electrical signal may be transmitted to the wireless communication line 1265, which is sent out in a wireless manner through the wireless communication line 1265 and the antenna 1269.

When receiving an image and/or text (e.g., an image and/or text inputted through a display screen, a keyboard, or a camera lens) inputted by the user of the (extended) central processing unit 191 (with a mobile phone function), the display interface circuit 1262 converts the image and/or text received through the input port 1267 into an electrical signal, and then transmits the electrical signal to the central processor 121; afterwards, the central processor 121 performs corresponding processing to the electrical signal, e.g., converting the electrical signal into a communication signal in conformity with the CDMA, the WCDMA, or the GSM protocol. The processed electrical signal may be transmitted to the wireless communication line 1265 and sent out in a wireless manner through the wireless communication line 1265 and the antenna 1269.

When receiving the wireless communication signal in conformity with a certain communication protocol (e.g., receiving the communications signal in conformity with the CDMA, WCDMA, or GSM protocol), the communication signal in conformity with the CDMA, WCDMA, or GSM protocol is received over a wireless communication line 1265 through the antenna 1269; the communication signal is transmitted to the central processor 121; afterwards, the central processor 121 performs corresponding processing to the communication signal. The communication signal received from the wireless communication line 1265 may includes an image signal, a text signal, and an audio signal. As previously mentioned, after performing corresponding processing to the image signal and/or text signal, the central processor 121 transmits the processed image and/or text signal to the display interface circuit 1262, and correspondingly controls the display device 1261 and the display interface circuit 1262 so as to display the image and/or text signal on the display device 1261. Also as previously discussed, after correspondingly processing the audio signal, the central processor 121 transmits the processed audio signal to the audio interface circuit 1264, correspondingly control the audio device 1263 and the audio interface circuit 1264, and plays the audio signal on the audio device 1263.

When processing the position and/or movement signal of the extended central processing unit 191, the position signal is received from the GPS (or positioning) satellite over the GPS (or positioning) circuit 166 through the antenna 1270; the position signal is transmitted to the central processor 121; afterwards, the central processor 121 correspondingly processes the position signal; when the position movement of the extended central processing unit 191 is processed, a result from processing a series of position signals may reflect the position movement of the extended central processing unit 191. To enable the peripheral processing unit 110 to detect the position and movement of the extended central processing unit 191, the central processor 121 sends, through the central communication circuit 122, a series of its own position signals to the peripheral communication circuit 102 in the peripheral processing unit 110; afterwards, the peripheral communication circuit 102 transmits a series of position signals of the extended central processing unit 191 to the peripheral processor 111. After a series of position signals of the extended central processing units 191 are processed, the peripheral processor 111 is informed of the position, movement and movement direction of the extended central processing unit 191; the current movement range of the extended central processing unit 191 is compared with its internal clock, such that the peripheral processor 111 can predict the movement speed of the extended central processing unit 191.

Figure 13:
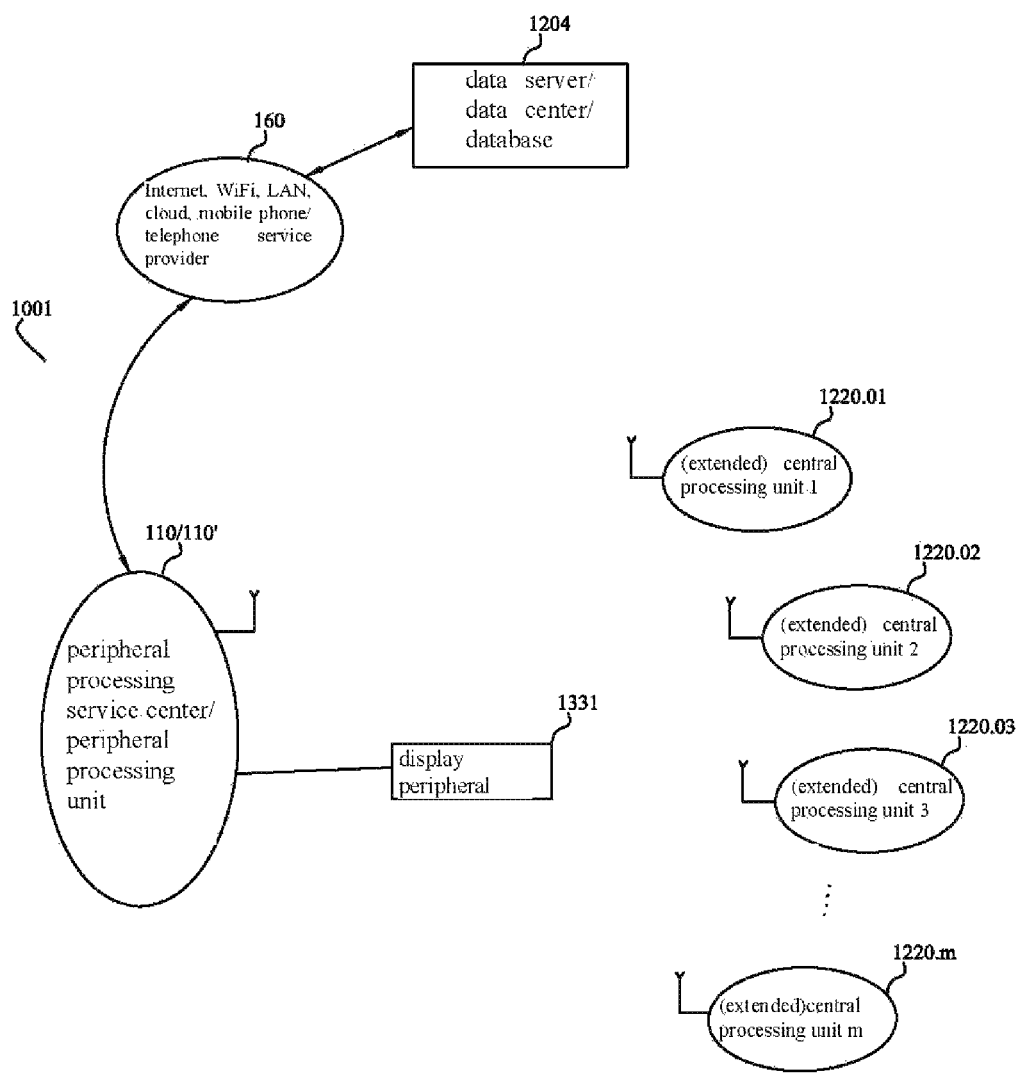
FIG. 13 shows a display system 1300 of the present disclosure.

FIG. 13 shows a display system 1300 of the present disclosure. In FIG. 13, the display system 1300 comprises a plurality of (extended) central processing unit 1220 (1220.1, 1220.2, . . . , 1220.*m*) and a display peripheral 1331 connected to the peripheral processing service center 110' (or peripheral processing unit 110); the peripheral processing service center 110' (or peripheral processing unit 110) is communicatively connected to the data server/data center/database 1204 over the Internet, WiFi, and local area network. The display system 1300 of the present disclosure can provide services of displaying (or playing) information in a time-sharing fashion for a plurality of extended central processing unit 1220 (1220.1, 1220.2, . . . , 1220.*m*); the information may include an image, text, and/or sound. In the display system 1300 shown in FIG. 13, each (extended) central processing unit 1220 (1220.1, 1220.2, . . . , 1220.*m*) may constantly send its ID out wirelessly at a certain time interval. Of course, FIG. 13 shows that the display system 1300 of the present disclosure is also applicable to a plurality of display peripherals 1331 (1331.1, 1331.2, . . . , 1331.*n*); the plurality of display peripherals 1331 (1331.1, 1331.2, . . . , 1331.*m*).

The display system 1300 shown in FIG. 13 has two service modes: a push service mode and an interactive service mode. In the push service mode, each central processing unit 1220 (1220.1, 1220.2, . . . , 1220.*m*) may send (or automatically) its ID out to the peripheral processing service center 110' (or peripheral processing unit 110) over its peripheral communication circuit 102. After receiving the ID of the central processing unit 1220 (1220.1, 1220.2, . . . , 1220.*m*), the peripheral processing service center 110' (or peripheral processing unit 110) selects one central processing unit 1220 (1220.*i*) thereof and searches relevant information (or searching relevant information in the data server/data service center/database 1204), and then displays (or plays) the found information related to the ID on the display peripheral 1331 (1331.1, 1331.2, . . . , 1331.*n*).

In the interactive service mode, each central processing unit 1220 (1220.1, 1220.2, . . . , 1220.*m*) may send out a Peripheral Use request including its ID to the peripheral processing service center 110' (or peripheral processing unit 110) through its peripheral communication line 102. After receiving the Peripheral Use request from the central processing unit 1220 (1220.1, 1220.2, . . . , 1220.*m*), the peripheral processing service center 110' (or peripheral processing unit 110) interacts in a manner that the peripheral processing service center 110' (or peripheral processing unit 110) ID is mutually matched (or paired) with the selected central processing unit 1220 (1220.*i*) ID. Based on the Interaction request from the selected central processing unit 1220 (1220.*i*), the peripheral processing service center 110' (or peripheral processing unit 110) searches relevant information per the Interaction request and/or ID (or searches relevant information in the data server/data service center/database 1204) and displays the found information relating to the ID and/or a user interface (which may be a user interface combined by images, texts, and sounds) on the display device 1261 in the selected central processing unit 1220 (1220.*i*).

FIG. 14 shows a display system 1400 of the present disclosure. The device configurations in the display system 1400 of FIG. 14 are identical to the device configurations in the display system 1300 of FIG. 13; different from the display system 1300 of FIG. 13, the display system 1400 of FIG. 14 may provide a service of simultaneously displaying (or playing) image/text/audio information for a plurality of (extended) central processing units 1220 (1220.1, 1220.2, . . . , 1220.*m*).

The working system 1200 shown in FIG. 14 provides a service of simultaneously displaying push information. In the service of simultaneously displaying the push information, each central processing unit 1220 (1220.1, 1220.2, . . . , 1220.*m*) may send its own ID (or automatically) to the peripheral processing service center 110' (or peripheral processing unit 110) over its peripheral communication circuit 102. After receiving the IDs of all central processing units 1220 (1220.1, 1220.2, . . . , 1220.*m*), the peripheral processing service center 110' (or the peripheral processing unit 110) searches information related to all the central processing units 1220 (1220.1, 1220.2, . . . , 1220.*m*) according to the IDs of all the central processing units 1220 (1220.1, 1220.2, . . . , 1220.*m*) (or searches information related to all the central processing units in the data server/data service center/data base 1204), and then displays (or plays) the searched information on the display peripheral 1331 (1331.1, 1331.2, . . . , 1331.*n*).

Optionally, in the service of simultaneously displaying the push information, the peripheral processing service center 110' (or the peripheral processing unit 110) may divide all the central processing units 1220 (1220.1, 1220.2, . . . , 1220.*m*) into a plurality of groups with common features; one of the groups is selected; information related to all IDs in the selected group is searched based on all IDs in the selected group (or information related to all IDs in the selected group is searched in the data server/data service center/database 1204), and then the found information is displayed (or played) on the display peripheral 1331 (1331.1, 1331.2, . . . , 1331.*n*). After the service to the selected group ends, the service will be provided to the next group.

Figure 15:
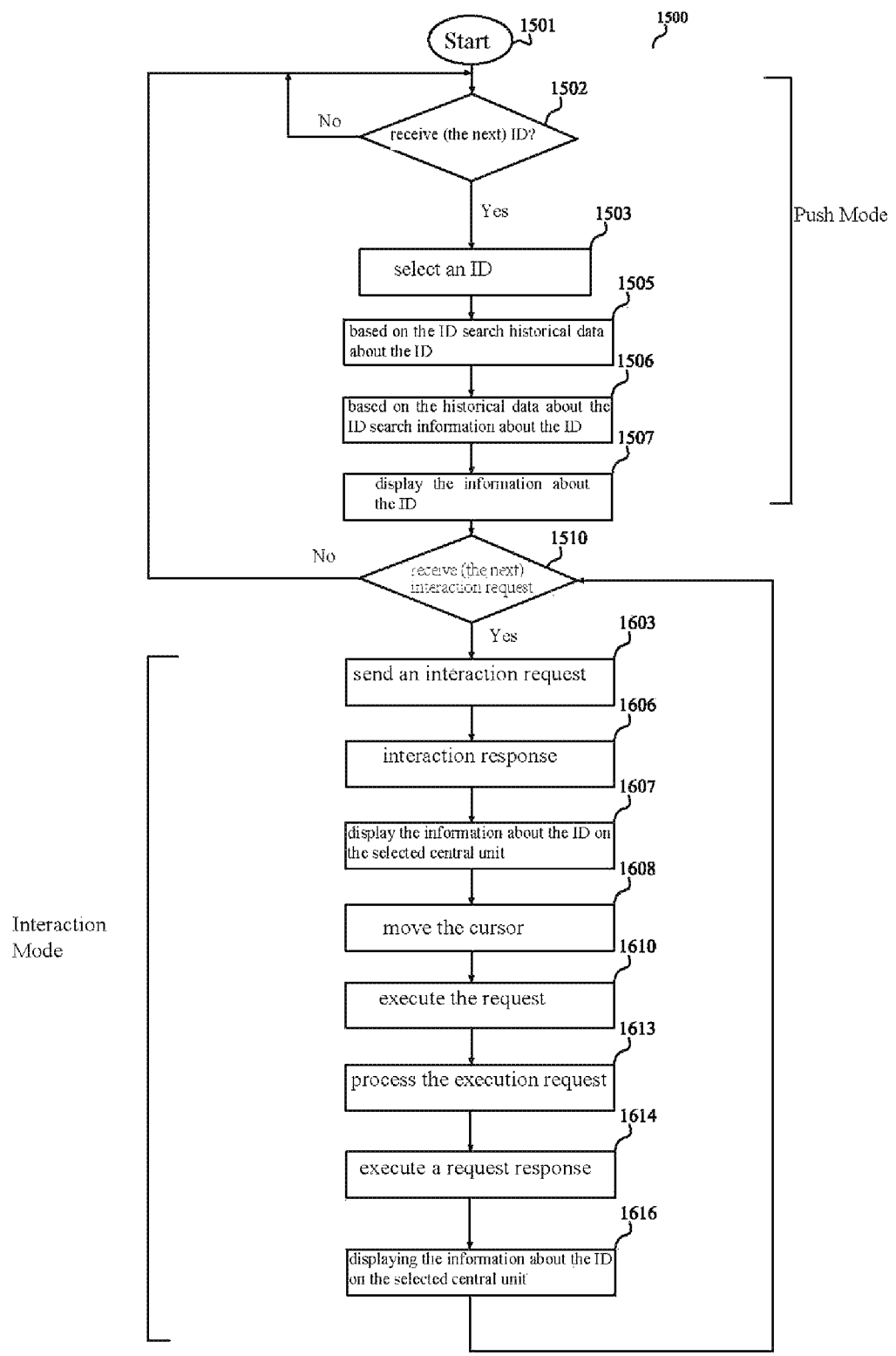
FIG. 15 is a flow chart 1500 of operating the display system 1300 of FIG. 13.

FIG. 15 shows a flow diagram 1500 of operating the display system 1300 shown in FIG. 13. In the flow diagram 1500, steps 1502-1507 are procedures of a push mode service; and steps 1603-1616 are procedures of an interactive mode service.

Step 1502: after turning to step 1502 from the start step 1501, the peripheral processing unit 110 (or the peripheral processing service center 110') detects whether the ID signals sent from one or more (extended) central processing units 1220 (1220.1, 1220.2, . . . , 1220.*m*) have been received. Because the peripheral processing unit 110 (or peripheral processing service center 110') and the (extended) central processing unit 1220 (1220.1, 1220.2, . . . , 1220.*m*) exchange information through a weak (or short-range) communication interface, when the peripheral processing unit 110 (or peripheral processing service center 110') detects the ID signals of one or more (extended) central processing units 1220 (1220.1, 1220.2, . . . , 1220.*m*), it indicates that the user of the one or more (extended) central processing units 1220 (1220.1, 1220.2, . . . , 1220.*m*) is located within a range where he/she can see the display peripheral 1231. If no (extended) central processing units 1220 (1220.1, 1220.2, . . . , 1220.*m*) are near the peripheral processing unit 110 (or peripheral processing service center 110'), the peripheral processing unit 110 (or peripheral processing service center 110') will not receive the ID sent by any (extended) central processing unit 1220; at this point, the flow diagram 1500 loops and waits at step 1502 till the peripheral processing unit 110 (or the peripheral processing service center 110') may receive the ID signals sent from one or more (extended) central processing units 1220 (1220.1, 1220.2, . . . , 1220.*m*). Each of the (extended) central processing units 1220 (1220.1, 1220.2, . . . , 1220.*m*) shown in FIG. 13 periodically sends out an information packet including its ID, the information packet including a start signal and an end signal, the ID information being included between the start signal and the end signal, facilitating the peripheral processing unit 110 (or peripheral processing service center 110') to capture the ID information between the start signal and the end signal, where the ID information may be an IP address or mobile phone number. The details about the procedure of how to send out the IDs are similar to the depictions of step 1103 of FIG. 11.

Step 1503: the peripheral processing unit 110 (or peripheral processing service center 110') selects one ID from the received one or more IDs, thereby selecting an (extended) central processing unit 1220 (1220.*i*) having the ID. The ID of the selected (extended) central processing unit 1220 (1220.*i*) may be stored in an internal memory of the peripheral processor 111.

Step 1505: the peripheral processing unit 110 (or the peripheral processing service center 110') searches, based on the selected ID, historical data associated with the selected ID (the historical data may include historical data about travel, purchase, reading, hobbies, etc.). The historical data associated with the selected ID may be stored in a local database and also may be stored in the data server/data center 1204; the peripheral processing unit 110 (or the peripheral processing service center 110') may search historical data associated with the selected ID in the data center 1204 over the Internet/local area network 160.

Step 1506: the peripheral processing unit 110 (or peripheral processing service center 110') further searches relevant information of the selected ID (the relevant information includes text/image/sound information of relevant travel, products, books, and hobbies) based on the historical data associated with the ID; the relevant information about the selected ID may be the information desired or needed by the user of the selected (extended) central processing unit 1220 (1220.*i*).

Step 1507: the peripheral processing unit 110 (or the peripheral processing service center 110') displays (or plays) the relevant information found for the selected ID on the display peripheral 1331.

Step 1510: the peripheral processing unit 110 (or peripheral processing service center 110') detects whether an Interaction request issued by the selected (extended) central processing unit 1220 (1220.*i*) has been received within a predetermined time period. If no Interact request is issued by the selected (extended) central processing unit 1220 (1220.*i*) within a predetermined time period, the operation turns to step 1502, to wait for and select the next ID, thereby selecting a next (extended) central processing unit 1220 (1220.j). The above-described push service mode is repeated. If a user of the selected (extended) central processing unit 1220 (1220.i) touches a predetermined area or any area (which may be an icon on the display screen 1261) on the display screen 1261, the selected (extended) central processing unit 1220 (1220.i) immediately issues an Interact request, and the operation turns to step 1603 to start an interaction operation mode; in the interaction mode, the display peripheral 1431 is locked, and the display content thereon maintains unchanged.

Step 1603: the selected (extended) central processing unit 1220 (1220.i) issues an Interaction Request information packet to the peripheral processing unit 110 (or the peripheral processing service center 110'). The Interaction Request information packet includes a start signal and an end signal; the Interaction Request information packet further includes one or more information segments (including the interactive request information segment and the ID of the selected (extended) central processing unit 1220.i), the one or more information segments being included between the start signal and the end signal, facilitating the peripheral processing unit 110 to capture the information between the start signal and the end signal.

Step 1606: After receiving the Interaction Request information packet, the peripheral processing unit 110 (or the peripheral processing service center 110') captures the ID of the (extended) central processing unit 1220 (1220.i), and the peripheral processor 111 checks the captured ID with the stored selected ID. If the two IDs match, the peripheral processing unit 110 (or the peripheral processing service center 110') issues an Interaction Request Grant Response information packet. The Interaction Request Grant Response information packet includes a start signal and an end signal and includes a plurality of information segments (including the interaction request grant information, the ID of the selected (extended) central processing unit 1220.i, the peripheral processing unit 110 (or the peripheral processing service center 110'), the content to display, and the user interface), the plurality of information segments being included between the start signal and the end signal, facilitating the central processing unit 120 to capture the information segments between the start signal and the end signal. Before issuing the Interaction Request Response information packet, the peripheral processing unit 110 (or the peripheral processing service center 110') may lock the display peripheral 1231 in FIG. 2B to forbid them from being affected by other central processing units.

Figure 16A:
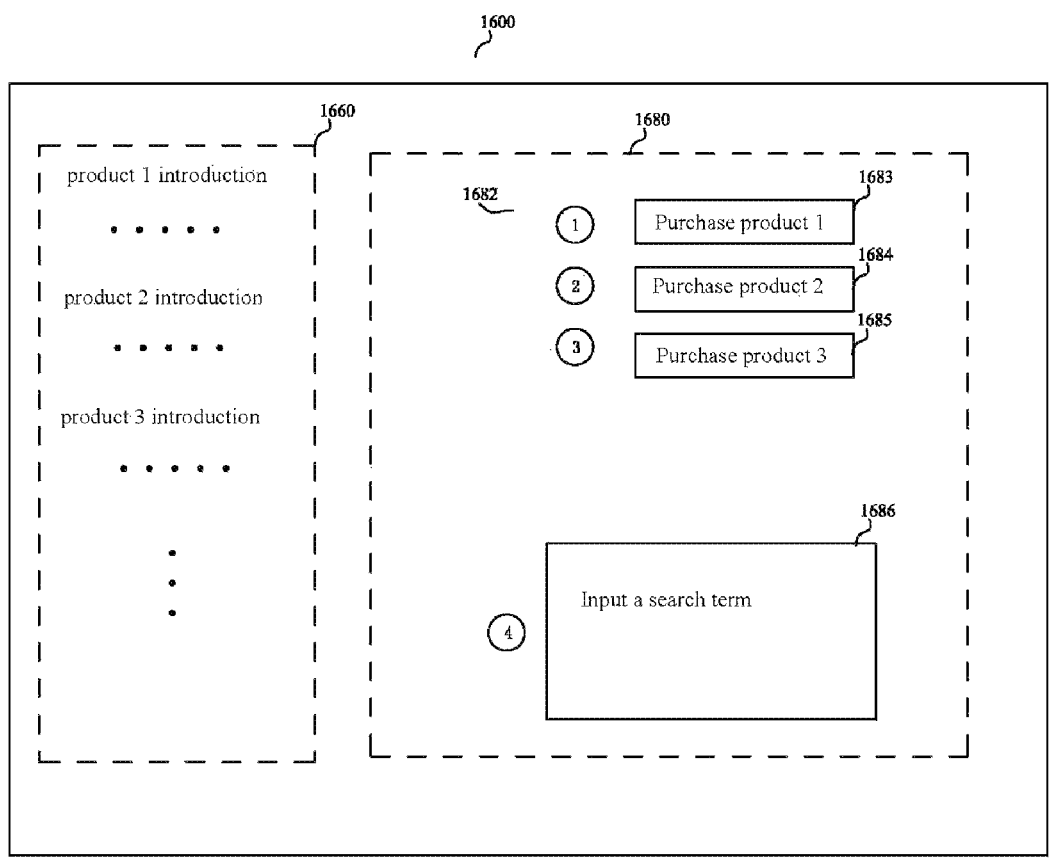
FIG. 16A shows an information box 1680 displayed on a display device 1261.

Step 1607: After receiving the Peripheral Operation Response, through verifying the recipient ID (i.e., the ID of the (extended) central processing unit 1220.i), the selected (extended) central processing unit 1220.i will display the information on the display peripheral 1231 on the display device 1261. As an embodiment, FIG. 16A shows an information box 1680 displayed on the display device 1261. As shown in FIG. 16A, the information box 1680 includes a product description region 1660 and a user interface 1680; the user interface 1680 includes a cursor 1682; options: purchased product 1 (1683), purchased product 2 (1684), and purchased product 3 (1685); and a text input search window 1686 for inputting a text search command.

Step 1608: to perform a desired operation on the user interface 1680, the operator will move the cursor 1682 in the user interface 1680 used for displaying by the selected (extended) central processing unit 1220.i as shown in FIG. 16A to a desired operation position.

Step 1610: the user of the selected (extended) central processing unit 1220.i selectively clicks onto one of three options 1683-1685; or after inputting the text search command in the window 1686, presses "Enter" key. Then, the selected (extended) central processing unit 1220.i issues an Execution Request information packet to the peripheral processing unit 110 (or peripheral processing service center 110'). The Execution Request information packet includes a start signal and an end signal, and also includes a plurality of information segments (including execution information, the ID of the selected (extended) central processing unit 1220.i, and the peripheral processing unit 110 (or the peripheral processing service center 110')), the plurality of information segments being included between the start signal and the end signal, facilitating the central processing unit 120 to capture the information segments between the start signal and the end signal. If the user clicks onto options 1683, 1684 or 1685, execute the request for purchasing product 1, product 2 or product 3; if the user inputs text in the window 1686 and presses "Enter" key, the execute information requires a further search according to the search command.

Step 1613: after receiving the Execution Request information packet, through checking the recipient ID (i.e., the ID of the peripheral processing unit 110 or the ID of the peripheral processing service center 110'), the peripheral processing unit 110 (or the peripheral processing service center 110') processes the execution request according to the content in the Execution Request information packet. In the case of a purchase request, the peripheral processing unit 110 (or the peripheral processing service center 110') completes the purchase record in the data center 1204 over the Internet/Local Area Network 160, and then transmits the purchase result to the selected (extended) central processing unit 1220.i in the manner of a peripheral operation response, and displays the purchase result on the display device 1261 of the selected (extended) central processing unit 1220.i. In the case of a search request, the peripheral processing unit 110 (or peripheral processing service center 110') searches in the data center/database 1204 over the Internet/Local Area Network 160.

Step 1614: After completely processing the Execution Request, the peripheral processing unit 110 (or peripheral processing service center 110') sends an Execution Request Response information packet to the selected (extended) central processing unit 1220.i, and sends the search result in step 1613 to the selected (extended) central processing unit 1220.i. The Execution Request Response information packet includes a start signal and an end signal, and includes a plurality of information segments (including a search result, User Interface, the ID of the selected (extended) central processing unit 1220.i, the peripheral processing unit 110 (or the peripheral processing service center 110')), the plurality of information segments being included between the start signal and the end signal, facilitating the central processing unit 120 to capture the information segments between the start signal and the end signal. After the Request Response information packet is sent out, the peripheral processing unit 110 (or peripheral processing service center 110') releases the display peripheral 1431.

Figure 16B:
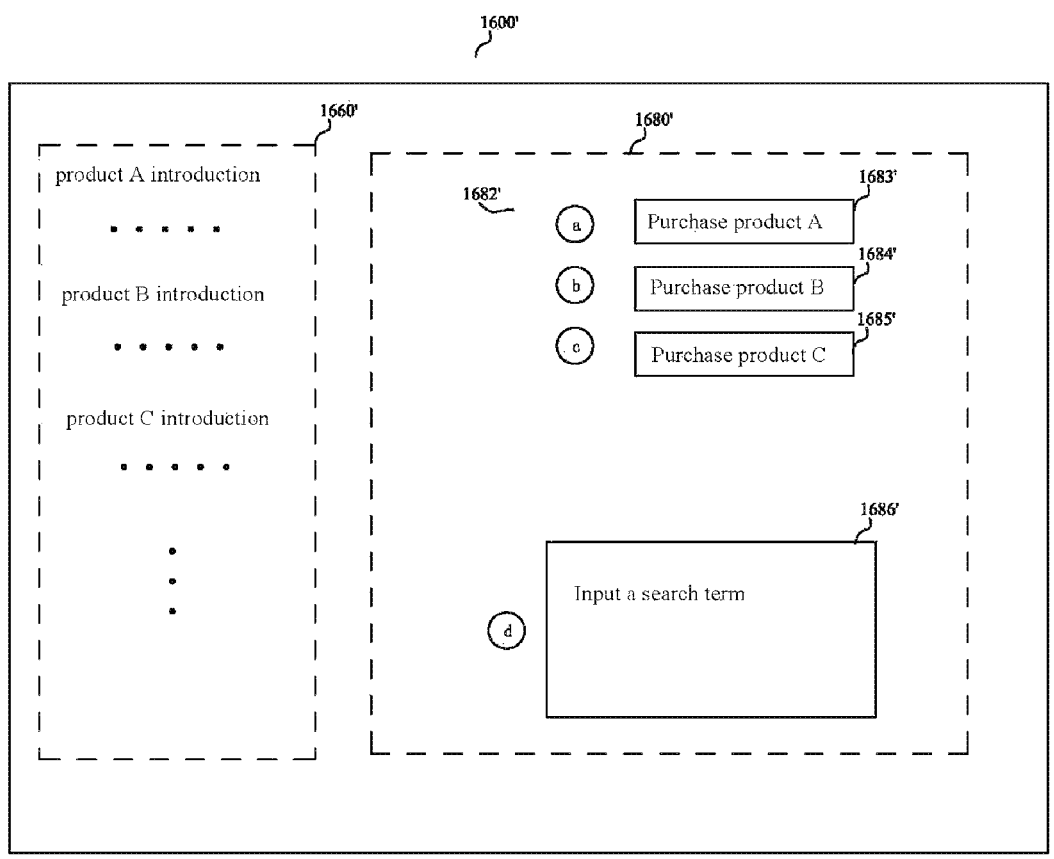
FIG. 16B shows an information box 1680' displayed on a display device 1261.

Step 1616: After receiving the Execution Request Response information packet, the selected (extended) central processing unit 1220.i displays the information found in step 1614 on the display device 1261. As another embodiment, FIG. 16B is an information box 1680' displayed on the display device 1261. As shown in FIG. 16B, the information box 1680' includes a product description region 1660' and a user interface 1680'; the user interface 1680' comprises a cursor 1682'; three options: purchase product a (1683'), purchase product b (1684'), and purchase product c (1685'); and a text input search window 1686', for inputting a text search command. After displaying the information on the display device 1261, the operation turns to step 1510 for a next round of selecting a push mode or an interaction mode.

After turning from step 1616 to step 1510, the peripheral processing unit 110 (or peripheral processing service center 110') detects whether a next round of interaction request issued by the selected (extended) central processing unit 1220 (1220.*i*) is received within a predetermined time period. If the selected (extended) central processing unit 1220 (1220.*i*) issues the next round of interaction request within the predetermined time period, the operation will enter into the next round of steps 1603-1616. In the next round of interaction mode, the operator may interact based on the content in the user interface 1680'. After turning from the step 1616 to the step 1510, if the selected (extended) central processing unit 1220 (1220.*i*) does not issue the next round of interaction request within a predetermined time period, the operation will enter the next round of steps 1502-1507. In the next round of push mode service, the peripheral processing unit 110 (or the peripheral processing service center 110') detects the next ID signal as issued and provides a push service based on the next ID signal.

Figure 17:
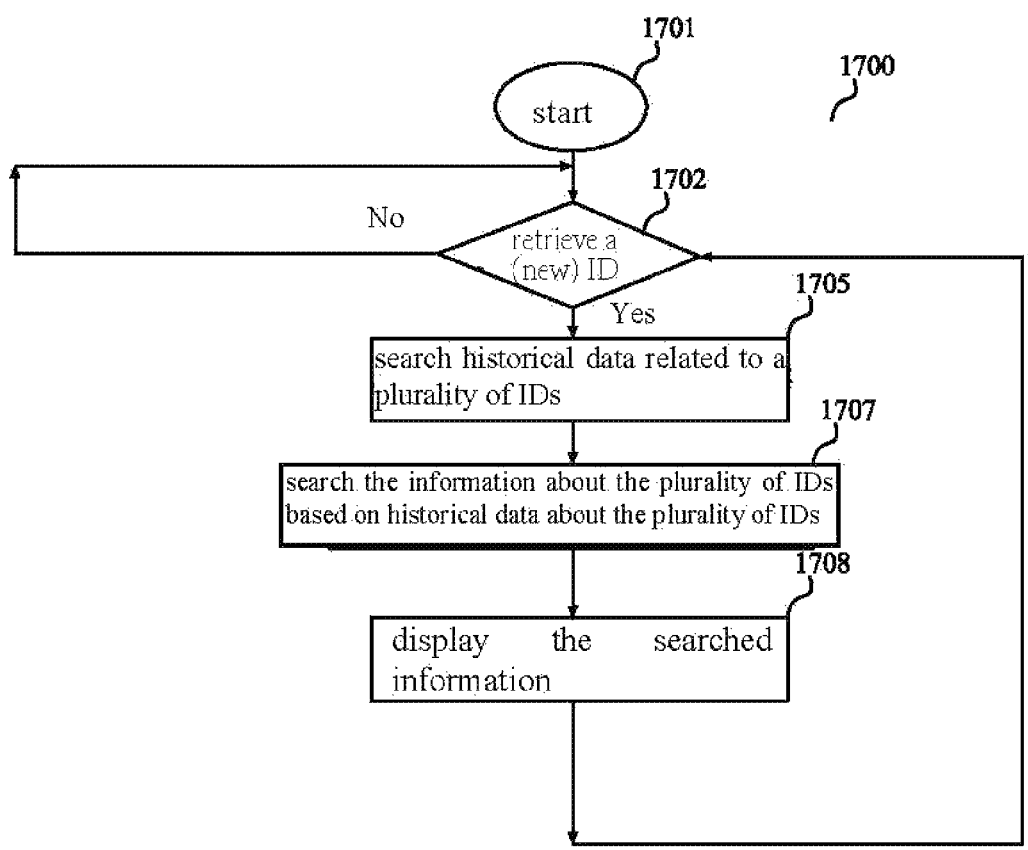
FIG. 17 is a flow diagram 1500 of operating the display system 1400 of FIG. 13.

FIG. 17 shows a flow diagram 1700 of operating the display system 1400 of FIG. 14.

Step 1702: after turning from start step 1701 to step 1702, the peripheral processing unit 110 (or the peripheral processing service center 110') detects whether a plurality of (extended) central processing units 1220 (1220.1, 1220.2, . . . , 1220.*m*) exist. If no (extended) central processing units 1220 (1220.1, 1220.2, . . . , 1220.*m*) are detected near the peripheral processing unit 110 (or peripheral processing service center 110'), the flow diagram 1700 loops at step 1702 till a plurality of (extended) central processing units 1220 (1220.1, 1220.2, . . . , 1220.*m*) move near the peripheral processing units 110 (or peripheral processing service center 110'). When the plurality of (extended) central processing units 1220 (1220.1, 1220.2, . . . , 1220.*m*) move near the peripheral processing unit 110 (or the peripheral processing service center 110'), the peripheral processing unit 110 (or the peripheral processing service center 110') will receive a plurality of IDs.

Step 1705: the peripheral processing unit 110 (or the peripheral processing service center 110') searches, according to the plurality of IDs, historical data associated with the plurality of IDs (the historical data may include historical data about travel, shopping, reading, hobbies, etc.). The historical data associated with the plurality of IDs may be stored in the local database or in the data server/data center 1204. The peripheral processing unit 110 (or the peripheral processing service center 110') may search historical data associated with a plurality of IDs in the data server/data center 1204 over the Internet/local area network 160.

Step 1707: the peripheral processing unit 110 (or peripheral processing service center 110') searches relevant information about the plurality of IDs (the relevant information includes text/image/audio information about travel, products, books, and hobbies) according to the historical data associated with the plurality of IDs; the relevant information about the plurality of IDs may be the information of common interest or desired by users of the plurality of (extended) central processing units 1220 (1220.*i*).

Step 1708: the peripheral processing unit 110 (or peripheral processing service center 110') displays (or plays) the information related to the selected ID on the display peripheral 1331. Then, the operation turns to step 1702 to provide an information display service for the next group of newly received IDs.

Figure 18:
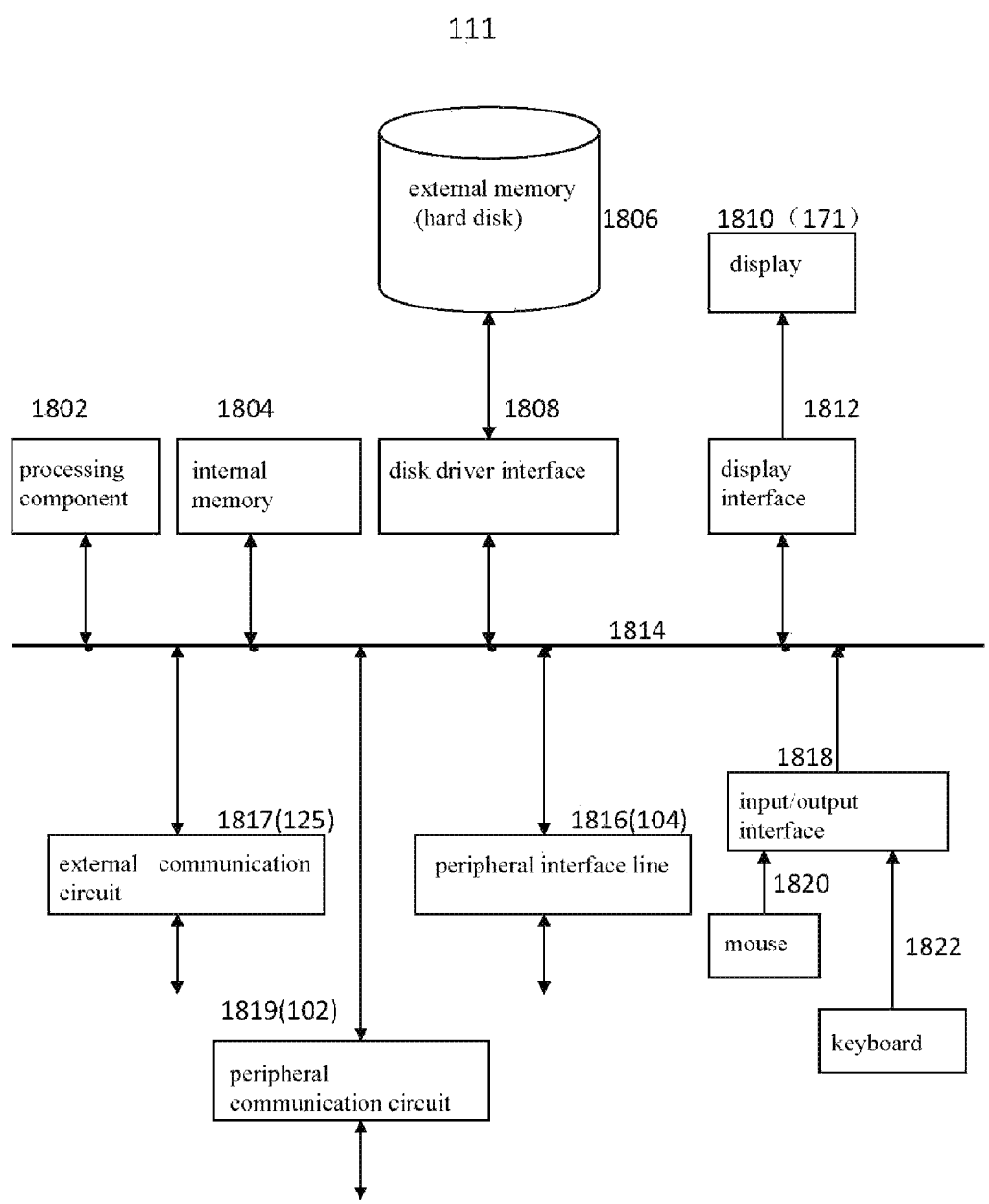
FIG. 18 shows an illustrative structure of the peripheral processor 111 in FIG. 1 or the server 1014 in FIG. 10C.

FIG. 18 shows an illustrative structure of the peripheral processor 111 in the peripheral processing unit 110 in FIGS. 1 and 3-9 or the server (e.g., 1014) in FIG. 10C (or peripheral processing service center 110'). As illustrated in FIG. 18, the peripheral processor 111 (or the server 1014 in FIG. 10C) comprises a processing component 1802, an internal memory 1804, an external memory (hard disk) 1806, a disk driver interface 1808, a display 1810 (or 171), a display interface 1812, a peripheral communication circuit 1817 (or 102), a peripheral interface circuit 1816 (104), an external communication line 1819 (125), an input/output interface 1818, a mouse 1820, a keyboard 1822, and a system bus 1814.

The external memory (hard disk) 1806 is connected with the disk driver interface 1808; the display 1810 is connected with the display interface 1812; the mouse 1820 and the keyboard 1822 are connected with the input/output interface 1818. The processing component 1802, the internal memory 1804, the disk driver interface 1808, the display interface 1812, the peripheral communication circuit 1817 (or 102), the peripheral interface circuit 1816 (104), the external communication line 1819 (125) and the input/output interface 1818 are connected with the system bus 1814. The internal memory 1804 and the external memory 1806 may store programs, instructions, and data. Generally, the internal memory 1804 has a faster access speed, while the external memory 1806 has a larger storage capacity. The display 1810 may provide a visual interface between the program being executed and the user. The peripheral communication circuit 1817 (or 102) is arranged for communication with the central processing unit 120; the peripheral interface circuit 1816 (104) is arranged for communication with the application peripheral 131 (131.1, 131.2, . . . , 131.*n*), and the external communication line 1819 (125) is arranged for communication with Extranet nodes. The processing component 1802 may read the program instructions and data in the internal memory 1804 and the external memory 1806 and may control running of the server by executing these programs and instructions.

Figure 19:
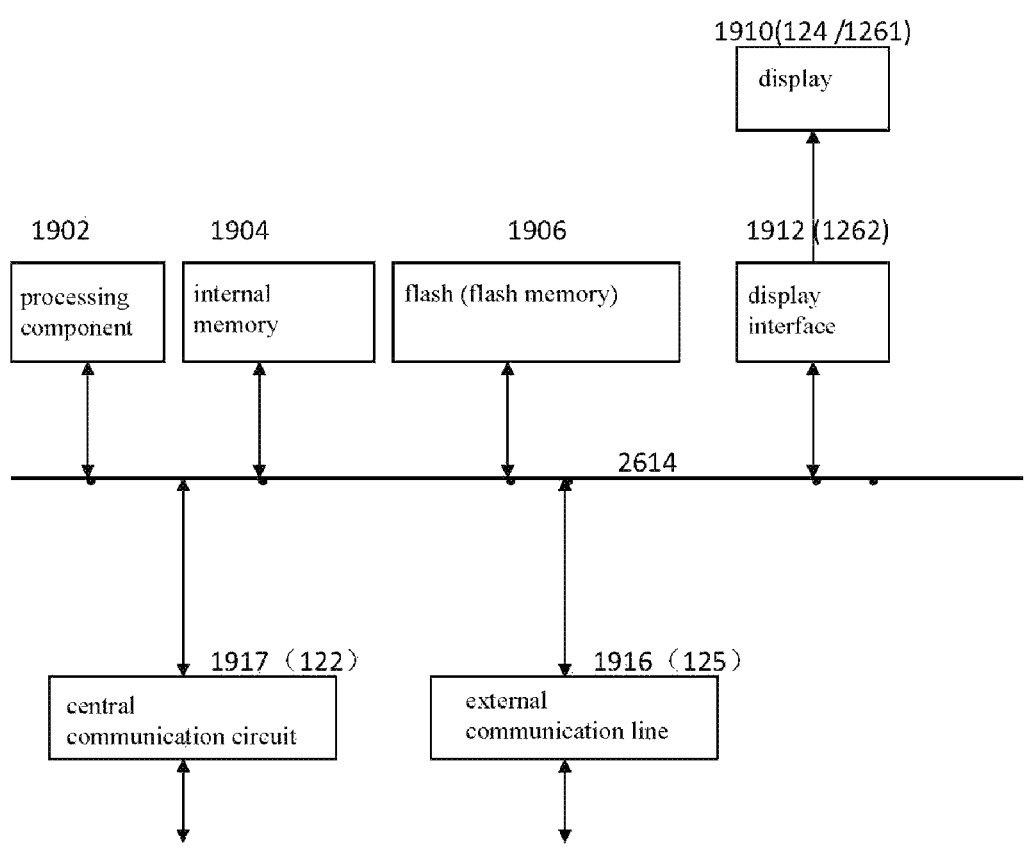
FIG. 19 shows an illustrative structure of the central processor 121 in FIG. 1.

FIG. 19 shows an illustrative structure of a central processor 121 of the central processing unit 120 in FIG. 1 and FIGS. 3-9. As illustrated in FIG. 19, the central processor 121 comprises a processing component 1902, an internal memory 1904, a flash memory 1906, a display 1910 (124/1261), a display interface 1912, an external communication line 1916 (or 125), a central communication circuit 1917 (122) and a group of system buses 1914.

The display 1910 is connected with the display interface 1912. The processing component 1902, the internal memory 1904, the flash (Flash Memory) 1906, the display interface 1912 (1262), the external communication circuit 1916 (or 125), and the central communication circuit 1917 (122) are connected with the system bus 1914. The internal memory 1904 and the flash (flash memory) 1906 may store programs, instructions, and data. Generally, the internal memory 1904 has a faster access speed, while the flash (Flash Memory) 1906 has a larger storage capacity. The display 1910 may provide a visual interface between the program being executed and the user. The central communication circuit 1917 (122) is arranged for communicating with the peripheral processing unit 110 (or peripheral processing service center 110'), and the external communication circuit 1916 (or 125) being arranged for communication with the Extranet nodes. The processing component 1902 may read the program instruction and data in the internal memory 1904 and the flash (Flash Memory) 1906, and may control running of the server by executing these programs and instructions.

The programs (or flows) in FIGS. 11, 15 and 17 may be stored in the internal memory 1804 or the external memory (hard disk) 1806 and may be executed by the processing component 1802, 1902. The programs (or flows) of FIGS. 11, 15, and 17 may also be stored in the internal memory 1904 or the flash (Flash Memory) 1906 and executed by the processing component 1902. The programs (or flows) as shown in FIGS. 11, 15, and 17 may be executed for multiple times in parallel (or simultaneously) (i.e., executed by multiple users), to respond to the invoking of a plurality of central processing units 120 (120.1, 120.2, . . . , 120.m) (or invoking of multiple users).

The peripheral communication circuit 102, the peripheral interface circuit 104, the central communication circuit 122, the external communication line 125, and the external communication line 1016 (125) in FIG. 1 may be an existing line, and particularly the interface line of each peripheral is an existing line; moreover, the communication lines with various Extranet nodes are also existing lines. Therefore, these circuits or lines will not be described in detail.

The present disclosure also has the following advantages: displaying data and information more effectively.

The three-in-one (central processing unit+peripheral processing unit+a plurality of peripherals) architecture may be dynamically combined, adjusted, upgraded, and changed, ensuring system stability to the maximum limit.

Due to functional simplification and centralization, the central processing unit is miniaturized, more portable, more energy-efficient, and more environmental and economical.

A plurality of peripherals are freely combined as needed, and a variety of peripherals may be selected; therefore, the peripheral utilizations are improved.

Each "central processing unit" is configured relatively fixedly, and may only occupy one IP address, one telephone number, and one device ID; besides, when integrated with an acquisition arrangement of human body life signals, it may be completely used as a personal identity identification ID of the owner and thus may be used in coordination with big data and cloud processing more efficiently.

It may facilitate building a dynamic specific area network, isolate from the Internet, flexibly constitute a closed local area network, and isolate a link to the external world, thereby satisfying security demands in network security control and anti-terrorist; likewise, by flexibly adding the peripherals accessing the Internet, an open local area network may be immediately formed.

The hardware device may be flexibly interfaced, which simplifies device structure, lowers the manufacturing cost, greatly increases the universality, and facilitates security management. With an existing logistic barcode scanner as an example, the logistic barcode scanner is a complete computer with a high manufacturing cost; the large amount of data stored thereby causes a security burden; with the present system, the structure of the logistic barcode scanner will be greatly simplified, the manufacturing cost will be lowered, and the data risk due to loss will be reduced substantially to zero; the data entry may be completed by arbitrarily using a common scanning peripheral or using other scanning peripheral, without a need of waiting for synchronizing data when changing the barcode scanner device.

The peripheral control system may be connected with peripherals such as office equipment, testing equipment, data acquisition devices, display devices and printing devices, etc., which are needed in different working and use environments, to construct an efficient, low-cost, and easily updatable, replaceable, and upgradeable dynamic service center, in areas such as airports, railway stations, cruise ships, large enterprises, schools, hospitals, libraries, etc., so as to provide personal supports for various central processing units accessing such areas in need of using relevant devices. With the airport as an example, after one central processing unit (120) enters into an area pre-set with a peripheral control system (110'), the central processing unit (120) may query the position where the required peripheral is located, whether it is available, how long it needs to wait, etc.; upon leaving or actively disconnecting after use, the peripheral may be immediately identified and used by other central processing unit (120), thereby greatly enhancing the utilization and convenience of the peripherals.

The peripherals are integrated with the peripheral control unit (110) or peripheral control system (110'), thereby constituting a more flexible and reliable shared peripheral. With the most common home TV set as an example, various sizes of displays and TV receivers and the like may constitute a peripheral system, or may be evenly fixed into an integral machine; then, a central processing unit (120) may continuously read the same book, watch the same album, and appreciate the same film on a display of any size.

Likewise, a memory as a peripheral may be integrated with a peripheral control unit (110) or peripheral control system (110'). The memory (hard disk) may provide and store data for any identifiable central processing unit (120).

I claim:

1. A display (image/audio) system comprising:
   a central processing unit; and
   a display (image/audio) peripheral processing unit (or display (image/audio) peripheral processing service center);
   wherein
   the central processing unit comprises:
     a central processor;
     a circuit for storing or identifying a central processing unit ID; and
     a central communication circuit connected to the central processor;
   the display peripheral processing unit (or display peripheral processing service center) comprises:
     a display peripheral processor (or display peripheral server);
     a peripheral interface circuit connected to the display peripheral processor;
     a peripheral communication circuit connected to the display peripheral processor;
   the central processing unit and the display peripheral processing unit (or peripheral processing server) communicate with each other through the central communication circuit and the display peripheral communication circuit;
   the peripheral interface circuit is connected with one or more display (image/audio) peripherals;
   the display peripheral processor (or display peripheral server) searches data and/or information according to the identified central processing unit ID, and output the searched data and/or information on the one or more display (image/audio) peripherals,
   wherein the display peripheral processor (or display peripheral server) identifies various IDs of various central processing units in a time-sharing mode, searches data and/or information for the central processing units with different IDs in a time-sharing mode based on the identified various central processing units IDs, and outputs the searched data and/or information on the one or more display (image/audio) devices.

2. The display system according to claim 1, wherein the display peripheral processing unit (or display peripheral processing service center) further comprises:
a second circuit for storing or identifying an ID of the display peripheral processing unit (or display peripheral processing service center).

3. The display system according to claim 1, wherein:
the central processing unit has a function of transmitting a request to the display (image/audio) peripheral processing unit (or display (image/audio) peripheral processing service center);
the display peripheral processor (or display peripheral server) searches data and/or information according to the request from the central processing unit, and outputs the searched data and/or information on the one or more display (image/audio) devices.

4. The display system according to claim 1, comprising:
a device for interaction between the central processing unit and the display (image/audio) peripheral processing unit (or display (image/audio) peripheral processing service center); wherein
the display peripheral processor (or display peripheral server) searches data and/or information in the interaction, and outputs the searched data and/or information on the one or more display (image/audio) devices.

5. The display system according to claim 1, wherein:
within a certain period of time, the display peripheral processor (or display peripheral server) only searches, based on the identified central processing unit ID, data and/or information for the central processing unit with the ID, and outputs the searched data and/or information on the one or more display (image/audio) devices.

6. The display system according to claim 1, wherein:
the display peripheral processor (or display peripheral server) identifies various IDs of various central processing units, based on the identified various central processing unit IDs, simultaneously searches data and/or information for the various central processing units with various IDs, and outputs the searched data and/or information on the one or more display (image/audio) devices.

7. The display system according to claim 1, wherein:
the central processing unit has a mobile phone function;
the ID of the central processing unit is an IP address or a mobile phone number.

8. A display system comprising:
a central processing unit; and
a display (image/audio) peripheral processing unit (or display peripheral processing service center);
wherein
the central processing unit comprises:
a central processor;
a first circuit for storing or identifying a central processing unit ID;
a central communication circuit connected with the central processor; and
a second circuit indicating a position movement of the central processor;
the display peripheral processing unit (or display peripheral processing service center) comprises:
a display peripheral processor (or display peripheral server);
a peripheral interface circuit connected with the display peripheral processor;
a peripheral communication circuit connected with the display peripheral processor;
a third circuit for identifying a position and/or speed of the position movement of the central processing unit;
the central processing unit and the display peripheral processing unit (or peripheral processing server) communicate with each other through the central communication circuit and the display peripheral communication circuit;
the peripheral interface circuit is connected with a plurality of display peripheral devices;
the display peripheral processor (or display peripheral server) searches data and/or information based on the identified central processing unit ID, and outputs the searched data and/or information on the plurality of display peripheral devices according to the position and/or speed of the position movement of the central processing unit,
wherein the display peripheral processor (or display peripheral server) identifies various IDs of various central processing units in a time-sharing mode, searches data and/or information for the central processing units with different IDs in a time-sharing mode based on the identified various central processing units IDs, and outputs the searched data and/or information on the one or more display (image/audio) devices.

9. A method for displaying information, comprising steps of:
receiving a processing unit ID at a peripheral processing unit in a wireless mode;
retrieving, by the peripheral processing unit, information about the processing unit ID based on the processing unit ID;
controlling, by the peripheral processing unit, to display the retrieved information about the processing unit ID on a peripheral,
wherein the display peripheral processor (or display peripheral server) identifies various IDs of various central processing units in a time-sharing mode, searches data and/or information for the central processing units with different IDs in a time-sharing mode based on the identified various central processing units IDs, and outputs the searched data and/or information on the one or more display (image/audio) devices.

10. The method according to claim 9, wherein
transmitting the processing unit ID on the central processing unit in a wireless mode.

11. The method according to claim 10, wherein
the central processing unit and the peripheral processing unit communicate via a weak (short-range) interface.

12. A method for displaying information, comprising steps of:
receiving a processing unit ID at a peripheral processing unit in a wireless mode;
retrieving, by the peripheral processing unit, information about the processing unit ID based on the processing unit ID;
transmitting, at the peripheral processing unit, the retrieved information about the processing unit ID to a central processing unit in a wireless mode,
wherein the display peripheral processor (or display peripheral server) identifies various IDs of various central processing units in a time-sharing mode, searches data and/or information for the central processing units with different IDs in a time-sharing mode based on the identified various central processing units IDs, and outputs the searched data and/or information on the one or more display (image/audio) devices.

13. The method according to claim 12, further comprising steps of:
    transmitting the processing unit ID on the central processing unit in a wireless mode;
    receiving, in a wireless mode on the central processing unit, the searched information related to the processing unit ID from the peripheral processing unit;
    displaying the information about the display processing unit ID on the central processing unit.

14. The method according to claim 13, wherein
    the central processing unit and the peripheral processing unit communicate via a weak (short-range) interface.

* * * * *